(12) United States Patent
Magee

(10) Patent No.: US 12,110,066 B1
(45) Date of Patent: Oct. 8, 2024

(54) LATERALLY WIND-DIVERTING VEHICLE FAIRING

(71) Applicant: Garth L. Magee, Hawthorne, CA (US)

(72) Inventor: Garth L. Magee, Hawthorne, CA (US)

( * ) Notice: Subject to any disclaimer, the term of this patent is extended or adjusted under 35 U.S.C. 154(b) by 0 days.

(21) Appl. No.: 18/658,952

(22) Filed: May 8, 2024

(51) Int. Cl.
    *B62D 35/00* (2006.01)

(52) U.S. Cl.
    CPC ................... *B62D 35/001* (2013.01)

(58) Field of Classification Search
    CPC ... B62D 35/001; B62D 35/002; B62D 35/005
    See application file for complete search history.

(56) References Cited

U.S. PATENT DOCUMENTS

| | | | | |
|---|---|---|---|---|
| 3,415,566 A | * | 12/1968 | Kerrigan | B62D 35/001 |
| | | | | 105/1.2 |
| 3,934,923 A | * | 1/1976 | Lissaman | B62D 35/001 |
| | | | | 296/180.2 |
| 3,972,556 A | * | 8/1976 | Mason, Jr. | B62D 35/001 |
| | | | | 296/180.2 |
| 4,021,069 A | * | 5/1977 | Hersh | B62D 35/001 |
| | | | | 296/180.4 |
| 4,098,534 A | | 7/1978 | Wood | |
| 4,210,354 A | | 7/1980 | Canning | |
| 4,313,635 A | * | 2/1982 | Front | B62D 35/001 |
| | | | | 296/180.3 |
| 4,957,325 A | * | 9/1990 | Engel | B62D 35/001 |
| | | | | 296/180.2 |
| D535,597 S | | 1/2007 | Herpel | |
| 7,404,592 B1 | | 7/2008 | Reiman et al. | |
| 8,491,035 B1 | * | 7/2013 | Pfaff | B62D 35/001 |
| | | | | 296/180.1 |
| 8,627,913 B1 | * | 1/2014 | Otterstrom | B62D 35/001 |
| | | | | 180/69.6 |
| 10,214,252 B2 | | 2/2019 | Schellekens et al. | |
| D918,108 S | | 5/2021 | Pereira et al. | |
| 11,220,302 B2 | | 1/2022 | Schellekens et al. | |
| 2001/0035020 A1 | * | 11/2001 | Gehman | B60H 1/24 |
| | | | | 165/41 |
| 2011/0291440 A1 | * | 12/2011 | Otterstrom | B62D 35/001 |
| | | | | 296/181.5 |
| 2013/0136001 A1 | * | 5/2013 | Mese | H04W 56/001 |
| | | | | 370/235 |
| 2013/0169001 A1 | * | 7/2013 | Calvert | B62D 35/001 |
| | | | | 296/181.5 |
| 2016/0368544 A1 | | 12/2016 | Heilaneh et al. | |
| 2017/0291348 A1 | * | 10/2017 | Sakurai | B29C 49/48 |
| 2017/0291648 A1 | * | 10/2017 | Watanabe | B62D 35/001 |

FOREIGN PATENT DOCUMENTS

| | | | | |
|---|---|---|---|---|
| CN | 1712300 A | * | 12/2005 | ............ B60Q 1/32 |
| DE | 2835455 A1 | * | 10/1979 | |
| DE | 3202812 A1 | * | 8/1983 | |
| EP | 0005095 B1 | * | 1/1982 | |
| WO | WO-8505603 A1 | * | 12/1985 | |

* cited by examiner

*Primary Examiner* — Lori Lyjak

(57) ABSTRACT

Aerodynamic fairing devices divert rising headwinds lifted over the top of a truck more laterally outwards to reduce vehicle drag. Embodiments include a truck cab roof mounted fairing, a streamlined truck cab roof, a fairing visor disposed on either cab roof fairing or on a streamlined truck cab roof, and a forwardly open-box sidewall assembly disposed on an upper portion of the front wall of a cargo box of a truck or semitrailer.

34 Claims, 19 Drawing Sheets

LATERALLY WIND-DIVERTING VEHICLE FAIRING

BACKGROUND OF THE INVENTION

Field of the Invention

The present embodiments relate to an apparatus for reducing drag on vehicles generally having substantially non-aerodynamic cargo boxes connected thereto, wherein the cargo boxes have a forward upper wall otherwise exposed to headwinds impinging thereon. Applicable vehicles include larger commercial box trucks with cargo boxes permanently attached thereto and also semitrucks towing semitrailers, but may also include smaller vans and other vehicles having a cargo box extending upwards above an uppermost edge of the front windshield of the vehicle.

Description of Related Art

Inherently characteristic of vehicles traveling on a highway at higher speeds, aerodynamic resistance, or parasitic drag, is an unwanted source of energy loss in propelling a vehicle. Parasitic drag on a vehicle surfaces includes viscous drag components of form (or pressure) drag and frictional drag. Form drag on a vehicle surfaces generally arises from the different profiles of various vehicle surfaces moving though air at the velocity of the vehicle. The displacement of air around a moving object creates a difference in pressure between the forward and trailing surfaces thereof, resulting in a drag force on the vehicle that is highly dependent on the relative wind speed acting thereon. Streamlining the vehicle surfaces can reduce the pressure differential developed thereon, thereby reducing form drag on the vehicle.

Frictional drag forces also depend on the speed of wind impinging exposed vehicle surfaces, and arise from the contact of air moving over surfaces. Both these types of drag forces arise generally in proportion to the square of the relative wind speed, per the drag equation.

Streamlined geometries are generally employed to reduce both of these components of drag force on various vehicle surfaces.

The blunt geometry of a headwind-exposed front wall of a rearward cargo box, either directly mounted to the vehicle or temporarily connected thereto, presents a very non-aerodynamic geometry disposed on the vehicle; the drag coefficient of a substantially blunt flat wall is substantially greater than that of a more streamlined rounded shape facing headwinds. For this reason, various streamlined fairings employ curved surfaces to thereby reduce form drag forces developed on the vehicle.

Properly designed, curved surfaces on vehicles can also reduce frictional drag forces resisting vehicle motion by reducing the frictional shear force developed thereon. By either redirecting headwinds to impinge thereon from a more oblique direction (rather than from impinging more directly in a substantially normal, more perpendicular orientation to the exposed surface), or by minimizing the surface area actually exposed to air flows—particularly laminar flows which typically induce higher surface shear forces on surfaces than do turbulent flows—impinging thereon, curved streamlined surfaces have been employed on various vehicle surfaces for decades in order to reduce overall vehicle drag.

Minimizing overall vehicle drag becomes particularly important at vehicle highway speeds, since the power required to propel a vehicle is a highly sensitive cubic function of wind speed. Thus, it becomes even more important to optimize vehicle efficiency at highway speeds, rather than at lower speeds. And improving overall vehicle efficiency through the use of various streamlining means is then best measured by comparing the actual power lost in drag, rather than simply through comparing drag forces on the vehicle.

Comparing power loss over vehicle drag becomes particularly more accurate when various vehicle surfaces—such as substantially blunt flat or curved surfaces that are exposed to headwinds—have substantially differing wind speeds impinging thereon, rather than simply the impinging wind-speed being that equal to the vehicle speed. Headwinds impinging normal to a flat plate, for example, may often need to accelerate sideways substantially above the vehicle headwind speed in order to move laterally to the side in order to flow around the flat plate.

Hence, the power losses due to frictional drag forces—in particular—induced on substantially blunt forward-facing vehicle surfaces are often enhanced, depending on the magnitude of the accelerated headwind moving more laterally there-across while impinging thereon. And momentum change components of drag loss are also enhanced by these accelerating and decelerating changes in wind speeds flowing across these more blunt surfaces facing headwinds, thereby exacerbating power loss on the moving vehicle. Hence, a combination of factors must be considered when streamlining various vehicle surfaces in order to reduce overall vehicle drag.

There are numerous examples over many years of various devices added to the vehicle in order to enhance vehicle streamlining in order to reduce vehicle drag. In particular, various fairing devices have been employed disposed above the level of a front windshield of a driver's cab in order to divert vehicle headwinds from impinging directly on the forward wall of the rearward cargo box disposed on larger industrial commercial trucks. For many years, cab roof fairings with rearward leaning curved surfaces have been employed to divert headwinds impinging thereon substantially upwards over the top of the rearward cargo box.

Examples in the art include both U.S. Pat. No. 9,937,965, US 2016/0368544 and D249,783—as well as numerous other patents—depicting cab roof fairings mounted on top of the cab of a tractor-trailer wherein the cab fairing is arranged to divert a substantial portion of the headwind impinging thereon upwards over the top of a rearward cargo box of the semitrailer connected thereto. As such, a substantial portion of the forwardmost surface of the cab roof fairing extends substantially laterally across the major lateral width of the cab, while also being slanted rearwards to divert headwinds impinging thereon substantially upwards over the top of the vehicle cargo box.

And numerous examples in U.S. Pat. No. 10,214,252 show roof fairings with flow-through openings to allow a relatively minor portion of the air otherwise flowing over the top of the rearward cargo box to instead flow through open passages in the roof fairing and behind the fairing. However, these cab fairings introduce substantial additional surfaces exposed to the diverted airflow, thereby increasing drag on these diverted airflows passing through these narrow passages, and substantially restricting the actual airflow passing there-through. These substantially restricted airflow passages largely negate the intended benefit. And these restricted passages are not optimally arranged to prevent substantial amounts of rising airflow from passing over the top of the vehicle.

And U.S. Pat. No. 5,513,894 depicts a roof fairing disposed on top of pickup truck that is arranged to divert a substantial portion of the headwind impinging thereon upwards over the top of a rearward trailer connected thereto, the trailer in this case being a substantially non-aerodynamic box-shaped recreational vehicle.

Also U.S. D482,303 depicts a roof fairing disposed on top of van-styled cab of a substantially non-aerodynamic box-shaped recreational vehicle, that is also arranged to divert a substantial portion of the headwind impinging thereon upwards over the top of the vehicle.

Furthermore, U.S. D314,163 depicts an upper roof portion of a tractor cab of a semitruck also arranged to divert a substantial portion of the headwind impinging thereon upwards over the top of the vehicle.

And finally, U.S. Pat. No. 4,098,534 and US 2012/0261946 both depict air diverting devices attached to an upper front wall of a rearward cargo box of a box truck or of a semitrailer connected to semitruck tractor, each of which divert major portions of headwinds impinging thereon to flow upwards above the vehicle.

As these multiple air-diverting devices having been already shown to substantially reduce drag on vehicles having a headwind-exposed cargo box front wall, any improvement in reducing vehicle drag for a similarly placed but improved device would be readily employed on today's commercial fleets already seeking improved fuel economies on their box trucks and semitrucks.

BRIEF SUMMARY OF THE INVENTION

The embodiments of the invention presented herein comprise air-diverting devices exposed to an upper vehicle headwind impinging thereon above the level of a front windshield of industrial trucks. The embodiments shown are arranged to divert a headwind from being lifted substantially upwards over the top of the moving vehicle, to instead flow in substantial part more laterally outwards around the sides of the rearward cargo box of a commercial vehicle, such as a cargo box truck or semitruck.

A first embodiment comprises cab roof-mounted fairing arranged to divert a rising headwind to instead flow more substantially to either lateral side of the vehicle. A second embodiment comprises an upper portion of a cab roof arranged to divert a rising headwind to instead flow more substantially to either lateral side of the vehicle. A third embodiment comprises a fairing visor disposed either on a cab roof fairing or on an upper portion of a streamlined cab roof that is arranged to divert a rising headwind to instead flow more substantially to either lateral side of the vehicle. And a fourth embodiment comprises an open-box panel assembly disposed on an upper portion of the front wall of a cargo box of the vehicle that is arranged to divert a rising headwind to instead flow more substantially to either lateral side of the vehicle. All aforementioned embodiments also reduce aerodynamic pressure from headwinds impinging on the vehicle.

BRIEF DESCRIPTION OF THE SEVERAL VIEWS OF THE DRAWINGS

While one or more aspects of the embodiments presented herein pertain to commercial vehicles having cargo boxes with forward upper walls otherwise substantially exposed to headwinds, essential elements of the various embodiments of the invention can be best understood by referring to the following figures.

DETAILED DESCRIPTION OF THE INVENTION

Description of Vehicle Drag Mechanics:

As mentioned, various embodiments of the present invention divert a rising headwind to instead flow more substantially to either lateral side of the vehicle. The substantial mass of air lifted upwards by the moving vehicle at highway speeds takes considerable unnecessary energy, since much of that airflow can be readily diverted to pass instead toward the lateral sides of the vehicle-rather than being lifted directly over the top of the vehicle-using various embodiments of the present invention.

Simple calculations indicate that by diverting a forward cross-section of rising airflow deflected upwards by impinging on front surfaces of a class six box truck or of a class eight semitruck—including such central portions thereof such as the vehicle grill, hood, windshield and forward wall of the rearward cargo box—that the power required to propel the industrial truck can be substantially reduced.

Figure 13:
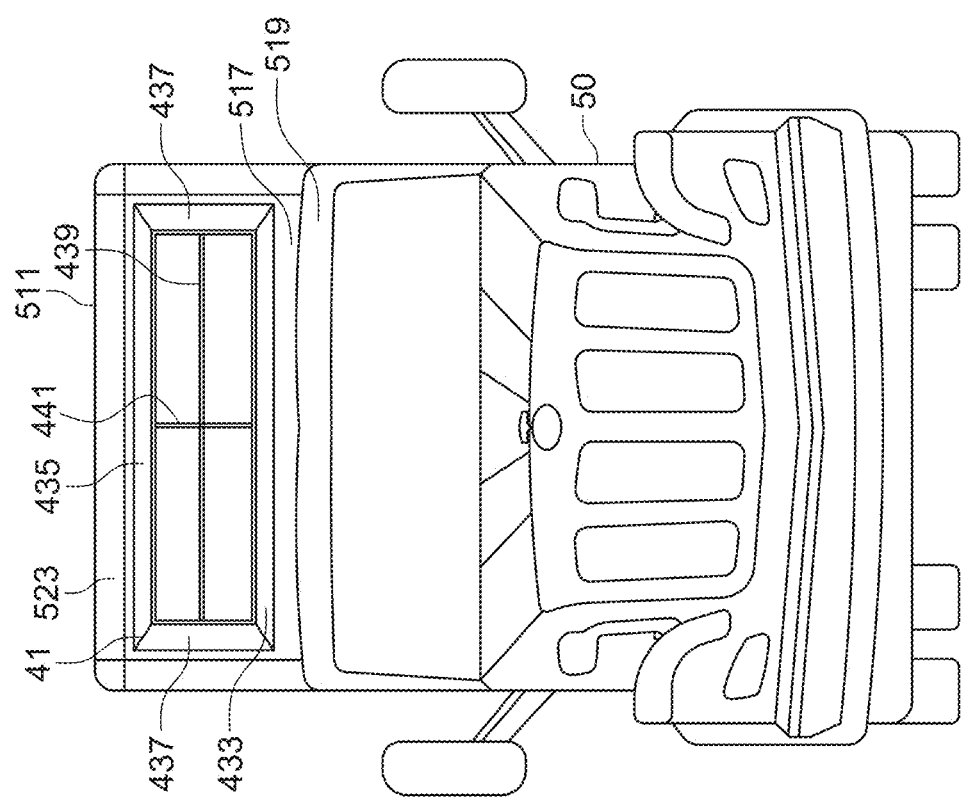
In FIG. 13, the wind-diverting open-panel assembly of FIG. 10 is shown in front view.

After all, the frontal cross section of exposed surfaces on class six box trucks or class eight semitrucks is substantial, estimated to be approximately 10 square meters. By examining airflow simulations on these style trucks (examples of which can be found in FIG. 13C of U.S. Pat. No. 10,518,825 or FIGS. 3A-3D of US 2016/0368544), it becomes apparent that a substantial portion of the impinging airflow is diverted substantially upwards over the top of the rearward cargo box, and that a substantial portion of that rising air flowing upwards over the front windshield could be instead diverted laterally by embodiments the present invention.

In order to obtain an estimate of the power savings potential of various embodiments of the present invention, fluid dynamic simulations can give an idea of the potential for diverting rising airflows over a moving tractor-trailer. Referring to the simulated streamlines shown FIG. 3C of US 2016/0368544, and by knowing the height and width of the semitrailer, it can be estimated that a substantial central portion of airflow impinging on the grill, hood and windshield otherwise flows upwards over the top of the trailing semitrailer.

For example, it is estimated that for a cross-sectional area of only a third of the total frontal cross-section of flowing air impinging on the front of the industrial truck being instead diverted laterally by an embodiment of the invention from otherwise flowing only one additional meter higher upwards over the vehicle while traveling at a typical highway speed of 70 mph, that 1-2 horsepower of propulsive power can be saved. And since some portion of the rising airflow near the center of the vehicle flowing over the grill and hood of the vehicle is likely being lifted substantially more than one meter over the top of the vehicle, that an average assumed value of airflow being diverted laterally from otherwise being lifted only one additional meter in elevation represents a reasonable assumed value of diverted airflow for this example examined further below.

Since it is commonly estimated that the steady-state power required to propel these classes of vehicles is somewhat less than a third of the available power produced by the engine of the vehicle, then it can be estimated that between 75 and 150 horsepower is needed to propel Class 6-8 cargo box vehicles at typical highway speeds, and that at least half of that power loss is being dissipated in aerodynamic drag—being about equal to 65% in aerodynamic losses at 70 mph as estimated in U.S. Pat. No. 10,214,252, Col. 3, lines 33-36 and Col. 4, lines 4-9 referring to a previous AIAA Paper 2004-2249—then it becomes apparent that an additional drag savings of perhaps one to two horsepower would offer a significant aerodynamic savings for propelling these industrial vehicles on the highway.

This amount of potential aerodynamic savings is especially significant for the smaller class six box trucks that typically require much less propulsive power, but can still benefit from a similar amount of laterally diverted airflow, since the frontal cross-sectional area of these smaller trucks is quite similar to that of the much larger semitruck, which typically require substantially more steady-state propulsive power while driving on the highway.

In the aforementioned example, the power being dissipated only in drag on class 6-8 trucks traveling at 65 mph would then likely range between 35 and 75 horsepower, with the rest being dissipated through mechanical losses including tire rolling-resistance losses. A two horsepower savings on a typical two-axle class six box truck having the same width and height as a semitruck towing a semitrailer, but requiring only as much as 75 horsepower in steady-state propulsive power to overcome both drag and mechanical losses, would then represent a nearly three percent increase in propulsive efficiency for this vehicle. Thus, the potential for the present invention to contribute to the increased fuel efficiency of these classes of vehicles is substantial, as only a fraction of one percent fuel savings can influence a truck purchasing decision for many truck fleets.

Indeed, an optimized version of one or more embodiments of the present invention tailored to a particular truck application may offer the potential to laterally divert substantially more headwind from otherwise flowing substantially upwards even more than one meter. Road testing of several configurations of the various embodiments on differently configured trucks will determine the optimal configuration for use on each type of vehicle.

But for this aforementioned example, the frontal cross-sectional area of the class six cargo box truck above the front bumper is about 9 square meters. If only one-third of that cross-sectional airflow is then diverted laterally, rather than being lifted an additional one meter upwards by the forward moving truck at 70 mph, then the power required to lift 3 square meters of cross-sectional airflow impinging the truck is equivalent to almost 1.5 horsepower being saved by diverting the rising airflow laterally.

In this example, the cargo box of the class six box truck typically extends over one meter above the roof of the cab. Clearly, it is then quite plausible that substantial savings in fuel efficiency can indeed be obtained by reducing the airflow being continuously lifted over the top this vehicle. After all, air itself has density exceeding 1.2 kg/m3 at sea level, thereby having substantial weight. At 70 mph the amount of airflow being displaced by the moving vehicle across one square meter of frontal cross-sectional exposed surfaces is approximately 31 m/sec×1.2 kg/m$^3$ equal to approximately 37 kg/(m$^2$·sec).

So in this example, assuming three square meters of cross-sectional airflow being diverted laterally rather than being lifted only one additional meter higher over the frontal cross-section of the vehicle, then the improved wind-diverting apparatus would divert laterally 3 m$^2$×37 kg/(m$^2$·sec) or 111 kg/sec. Thus, an embodiment of the present invention has the potential to divert a substantial amount of air weight from otherwise being continuously lifted by the vehicle while driving down the highway. And the power required to lift this sustained weight lift while driving at 70 mph is then 111 kg/sec×9.8 m/sec$^2$×1 m/1 sec, about equal to 1100 Joules, or 1.5 horsepower.

And so by diverting this substantial rising airflow to instead flow laterally around the vehicle sides, various embodiments of the present invention can save the wasted energy needed to lift this considerable air weight passing substantially over the top of the vehicle, thereby enhancing the fuel efficiency of the vehicle.

Thus this example clearly demonstrates that for a class six box truck, a 1-2 percent increase of propulsive efficiency provided by various embodiments of the invention is quite likely to be obtained in many vehicle applications, with some configurations likely exceeding that amount. The optimal embodiment for use on each type of vehicle may ultimately be a customer-based determination based on the cost-effectiveness of each configuration and the particular operating conditions in which the fleet trucks most often operate.

DESCRIPTION OF VARIOUS EMBODIMENTS

Various embodiments of the invention are first described in detail below, with each embodiment providing means to divert a headwind from being lifted substantially upwards on the moving vehicle, and to instead flow in substantial part more laterally outward around the sides of the rearward cargo box of a substantially non-aerodynamic vehicle such as a cargo box truck or semitruck. In consideration of the embodiments described below, the operating principles described above will generally apply, and may be referred thereto.

First Embodiment—FIGS. 1-3, 17 and 18

Figure 1:
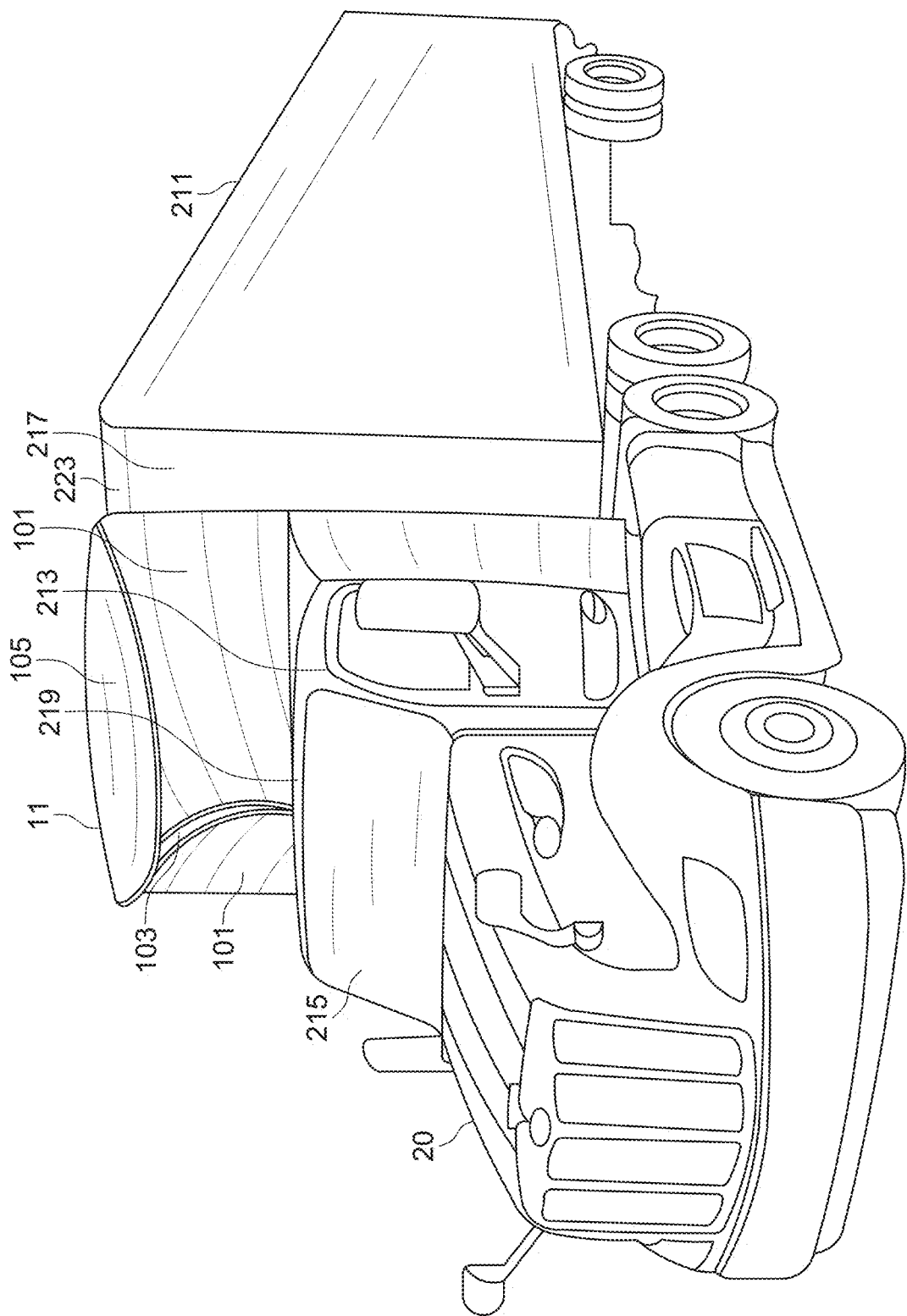
In FIG. 1, a wind-diverting fairing assembly with substantially curved sidewall panels is shown in oblique view disposed above a driver's day cab of a semitruck having a rearward cargo box of a semitrailer connected thereto.
Figure 2:
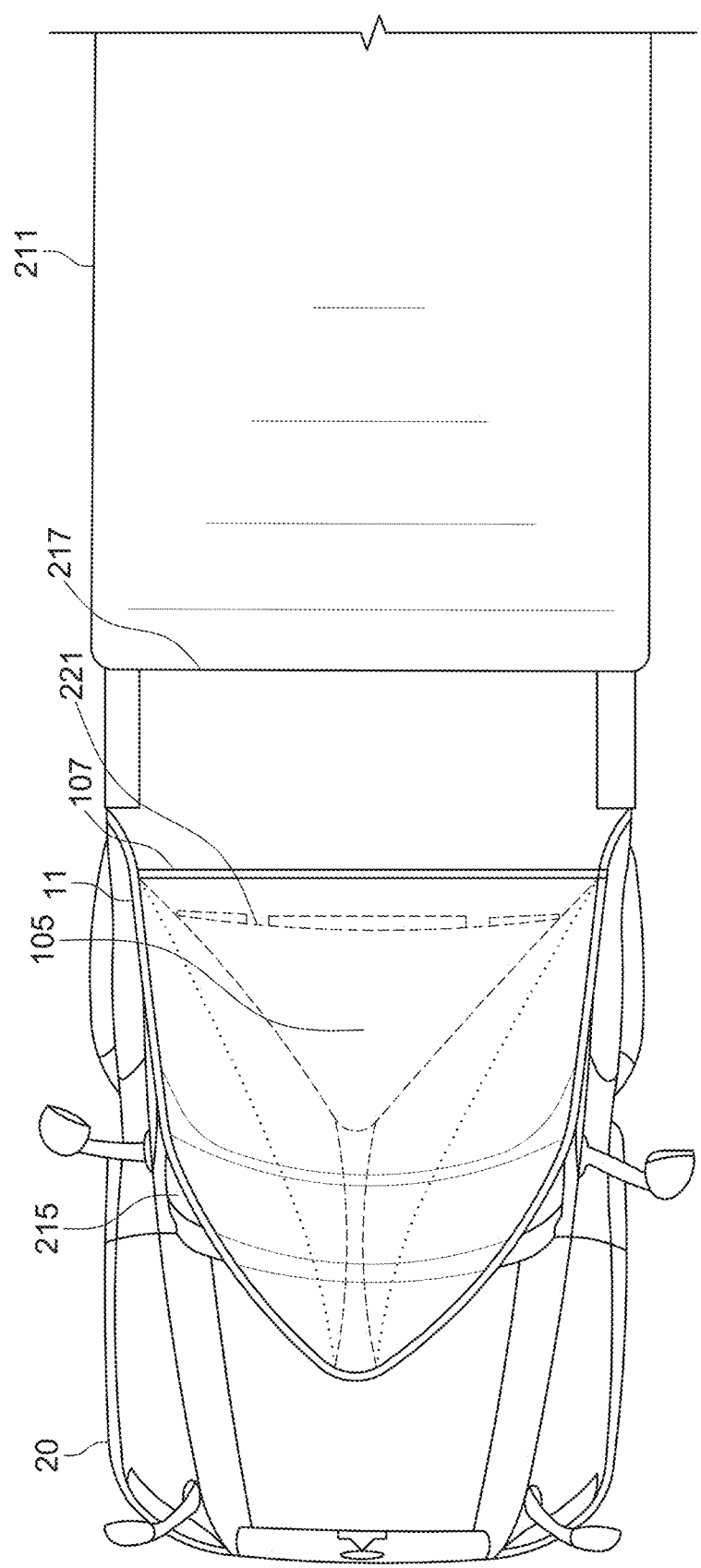
In FIG. 2, the wind-diverting fairing assembly of FIG. 1 is shown in top view.
Figure 3:
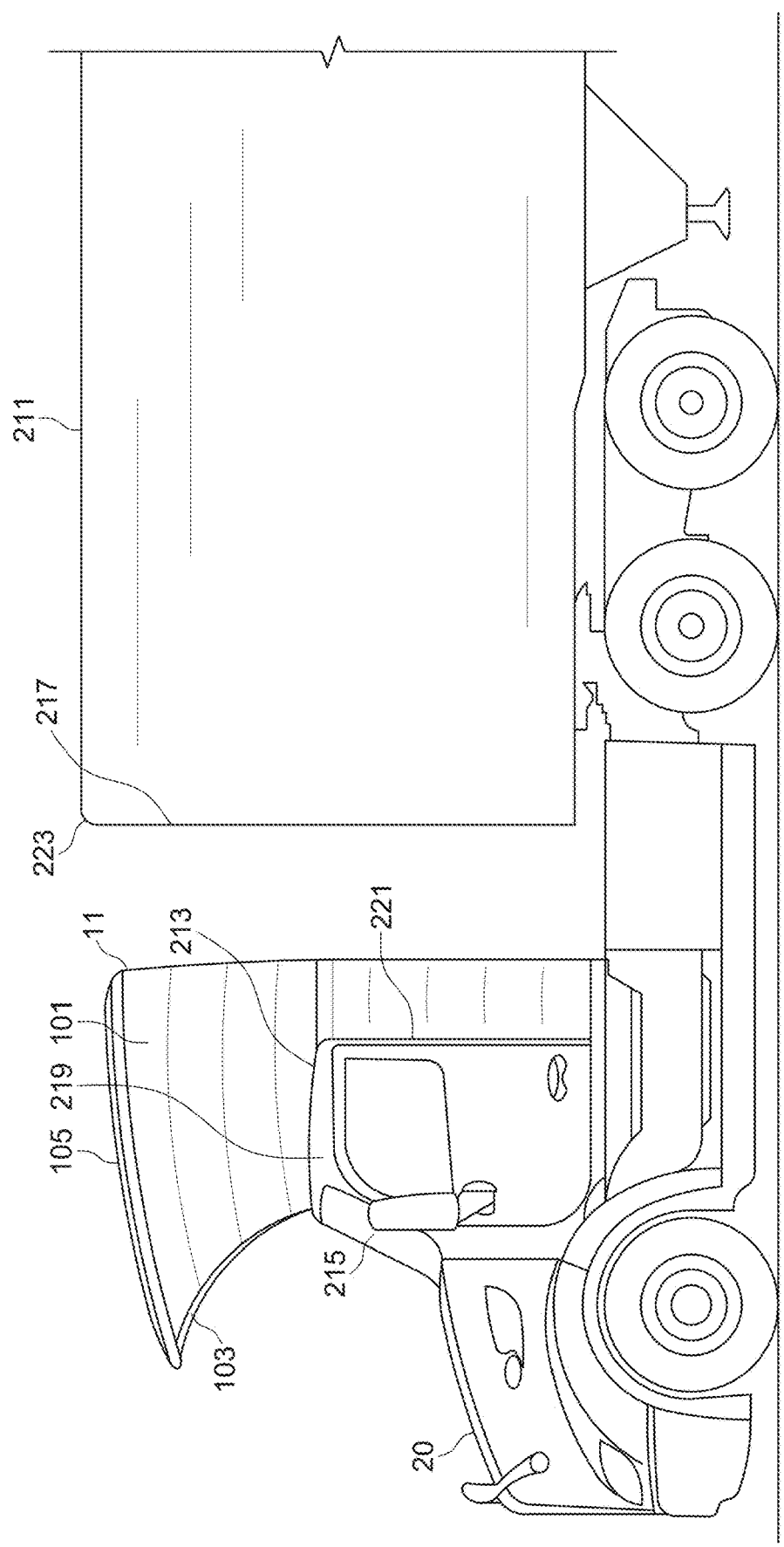
In FIG. 3, the wind-diverting fairing assembly of FIG. 1 is shown in side view.

As shown in FIGS. 1, 2 and 3, a first embodiment comprises a wind-diverting fairing assembly 11 disposed above a driver's day cab 213 of a semitruck or tractor-trailer 20 in front of an upper portion of a forwardmost laterally extending wall of the cargo box 211 thereof. The upper portion of the cargo box front wall 217 extends above the roof 219 of the cab 213 wherein substantial headwinds otherwise diverted upwards by the moving vehicle are instead redirected by the fairing assembly 11 to flow more laterally outwards toward the sides of the vehicle.

The fairing assembly 11 includes two laterally extending, non-horizontal sidewalls 101 disposed proximally adjacent together at respective forwardmost portions thereof. The fairing sidewalls 101 extend substantially rearward on the vehicle in a laterally divergent manner, wherein rearmost portions thereof are arranged substantially apart in lateral disposition. The sidewalls 101 each comprise an upper forwardly facing portion thereof arranged to be slanted vertically outwards, wherein any normal vector projecting outwards from the surface thereof points downwards below the horizon.

In this example embodiment of FIG. 1, the overhanging upper forwardly facing sidewall portions also each comprise a smoothly curved concave portion thereof that more effectively contains and diverts the upward flow of headwinds to instead be substantially redirected to flow in a smooth manner more laterally along the lateral sidewalls 101 and rearward toward the lateral sides of the vehicle.

As shown in FIGS. 1, 2 and 3, an embodiment of the fairing assembly 11 is disposed forwardly above the cab 213 wherein a nose joint 103 of the fairing assembly 11 substantially connects the two curved sidewalls 101 at forwardmost portions thereof. As shown, the nose joint 103 extends substantially forward over and above the windshield 215 of the cab, wherein rising headwinds diverted upwards by the windshield 215 are substantially diverted laterally while impinging the fairing assembly 11, and are thereby being redirected along and largely underneath overhanging uppermost portions of the fairing sidewalls 101 toward the lateral sides of the vehicle.

Moreover, the overhanging upper forwardly facing portions of the fairing sidewalls 101 further contain and divert the upward flow of the headwind to instead be substantially redirected laterally underneath the upper overhanging curved sidewall portions along the laterally divergent sidewalls 101 toward the sides of the vehicle. As configured, the overhanging sidewall portions function in part similarly to another embodiment described further below.

In this example embodiment, the fairing assembly 11 also comprises at top panel 105 extending between the sidewalls 101, and in some embodiments may also further extend laterally beyond the sidewalls 101 to overhang substantial portions thereof. The top panel 105 is also arranged slanted slightly upwards from the front to the rear edge 107 thereof. And the rear edge 107 of the top panel 105 is positioned towards the upper edge 223 of the front wall 217 of the cargo box 211, in order help direct any headwind impinging on the top panel 105 to flow smoothly over the top of the rearward cargo box 211.

The fairing sidewalls 101 are also shown extending substantially further to somewhat rearward of the rear wall 221 of the cab 213 in order to more smoothly guide the redirected headwinds laterally along the sidewalls 101, thereby minimizing any drag induced thereon. As configured, the fairing assembly 11 is arranged front-to-back in a more sharply shaped, pointed manner than various prior art cab fairing devices diverting headwinds largely over the top of the vehicle, thereby being arranged for a more aerodynamic profile to more easily penetrate headwinds by diverting rising headwinds more laterally toward the sides of the vehicle.

As arranged, rearwardly directed components of drag induced on the rearwardly slanted fairing sidewalls 101 are minimized, as typically arranged in the nose cone of a high-speed missile. Since pressure forces are generally directed normal to the headwind exposed surface, the more streamlined sharply shaped slanted sidewalls 101 act to further minimize any rearwardly directed form drag induced on the sidewalls 101, further enhancing the propulsive efficiency of the vehicle.

And with the nose 103 of the fairing assembly 11 being substantially centered laterally across the cab 213, and with the sidewalls 101 being arranged largely symmetric about both lateral sides of the fairing assembly 11, any laterally directed components of form drag induced on the sidewalls 101 are largely offset by similar opposite forces induced on the opposite sidewall 101, being directed in the opposite lateral directions-except perhaps under very anomalous extreme crosswind conditions.

Figure 17:
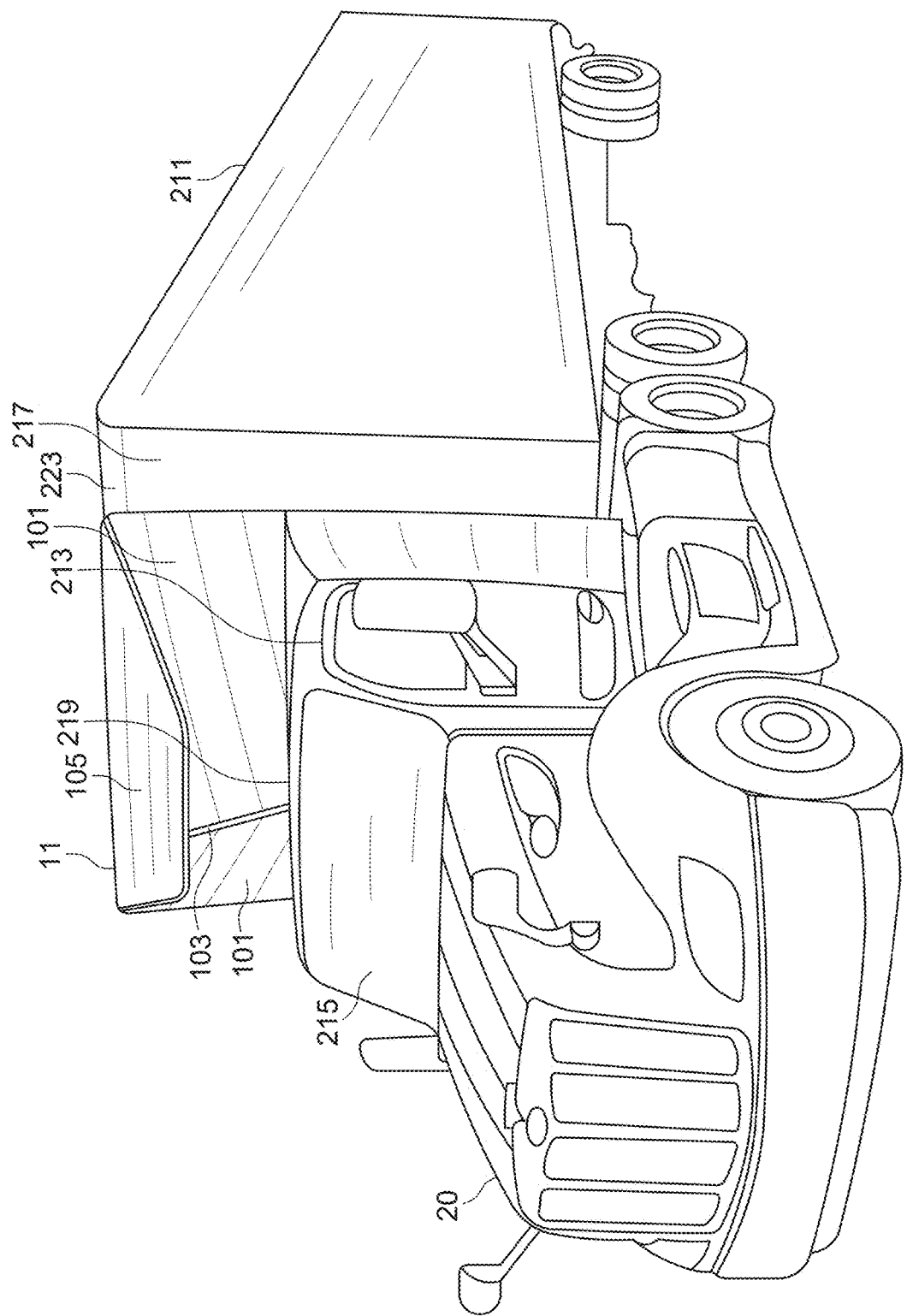
In FIG. 17, a wind-diverting fairing assembly with substantially flat sidewall panels is shown in oblique view disposed above a driver's day cab of a semitruck having a rearward cargo box of a semitrailer of a semitruck.

In FIG. 17, another example embodiment comprises the fairing sidewalls 101 thereof being substantially flat along major portions thereof, while also being slanted outwards in an overhanging manner in order to better contain the rising headwinds flowing there-along. And the nose joint 103 in this embodiment is shown substantially narrow and pointed in order to more sharply divide the rising headwind to flow toward either lateral side of the vehicle.

In this embodiment, the top panel 105 is shown extending substantially forward beyond the nose joint 103 to also overhang the fairing sidewalls 101. As arranged, the top panel 105 overhangs the sidewalls in order to more effectively contain and divert the upward flow of headwinds to instead be substantially redirected to flow in a smooth manner more laterally along the fairing sidewalls 101 toward the sides of the vehicle.

Figure 18:
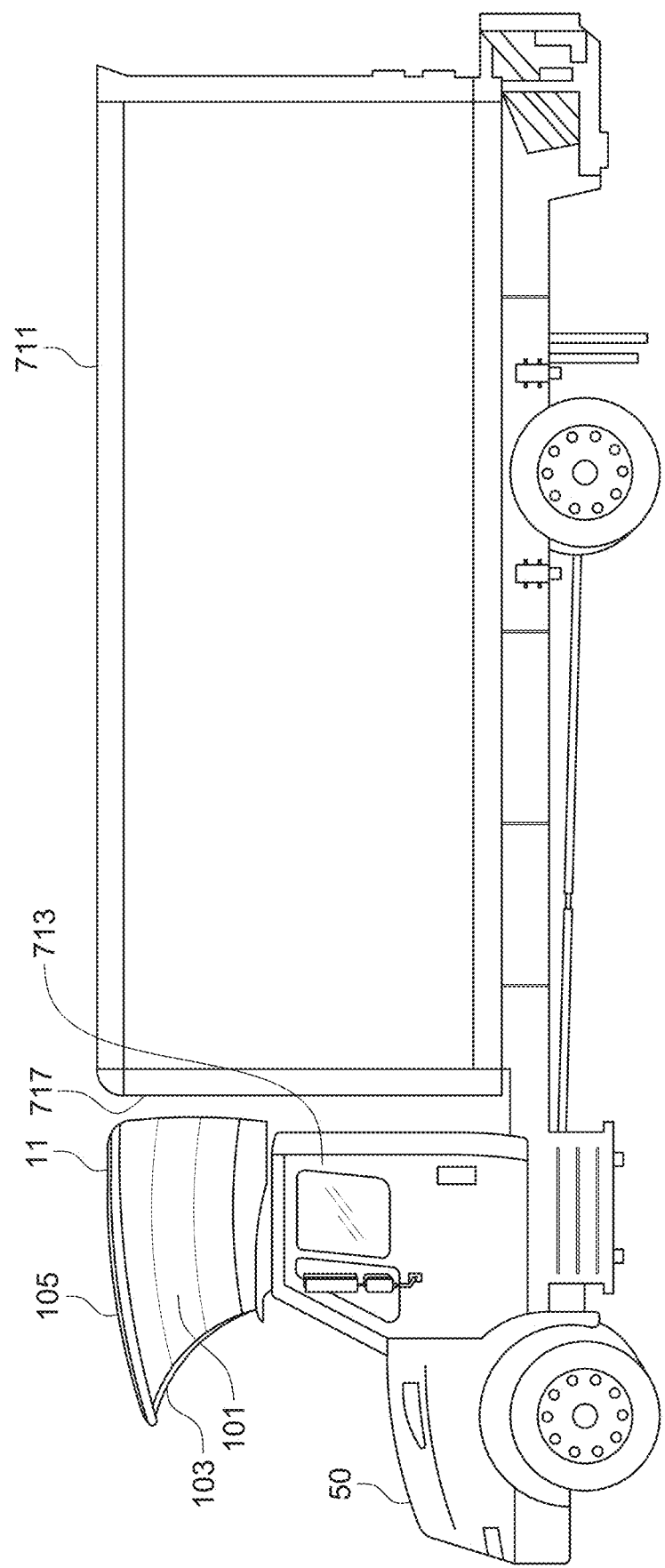
In FIG. 18, a wind-diverting fairing assembly with substantially curved sidewall panels is shown in side view disposed above a driver's day cab of a cargo box truck.

While the example embodiment is shown disposed on a tractor-trailer cab 213, similar embodiments are also applicable to disposition on other vehicles, such as a smaller class six box truck 50 as shown in FIG. 18. In FIG. 18 the cargo box truck 50 has a wind-diverting fairing assembly 11 disposed above a driver's day cab 713 of the vehicle in front of an upper portion of a forwardmost laterally extending wall 717 of the rearward cargo box 711 permanently attached to the vehicle. The fairing assembly 11 is configured with elements 101, 103 and 105 similar to those respective elements of fairing assembly 11 of FIGS. 1-3, but is instead being disposed on the cab 713 of the smaller box truck.

And in consideration of other embodiments of the present invention described below, the operating principles described above will generally apply, and may be referred thereto.

Figure 4:
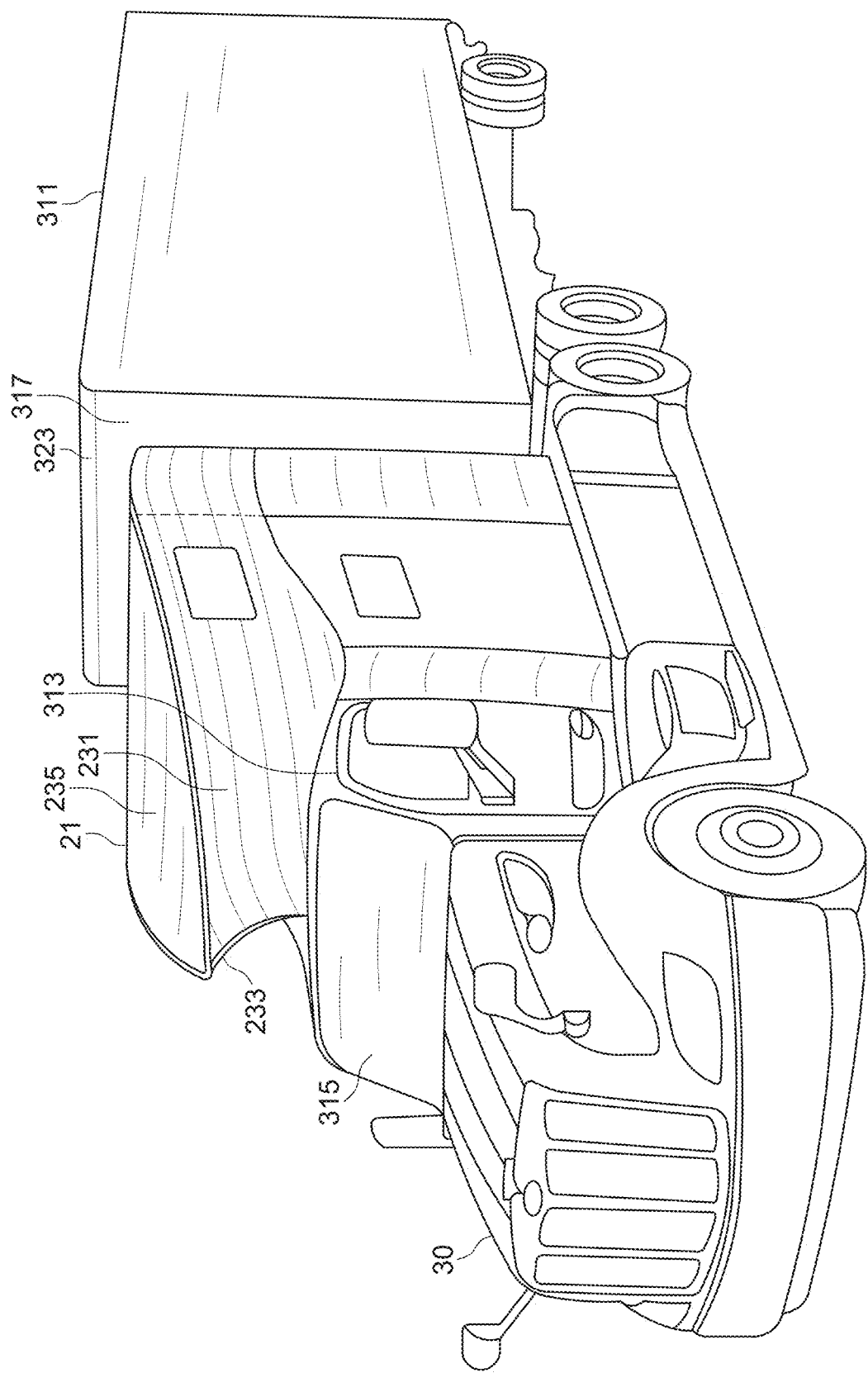
In FIG. 4, a wind-diverting fairing-styled roof of a driver's sleeper cab of the tractor of a semitruck having a rearward cargo box of a semitrailer connected thereto is shown in oblique view.
Figure 5:
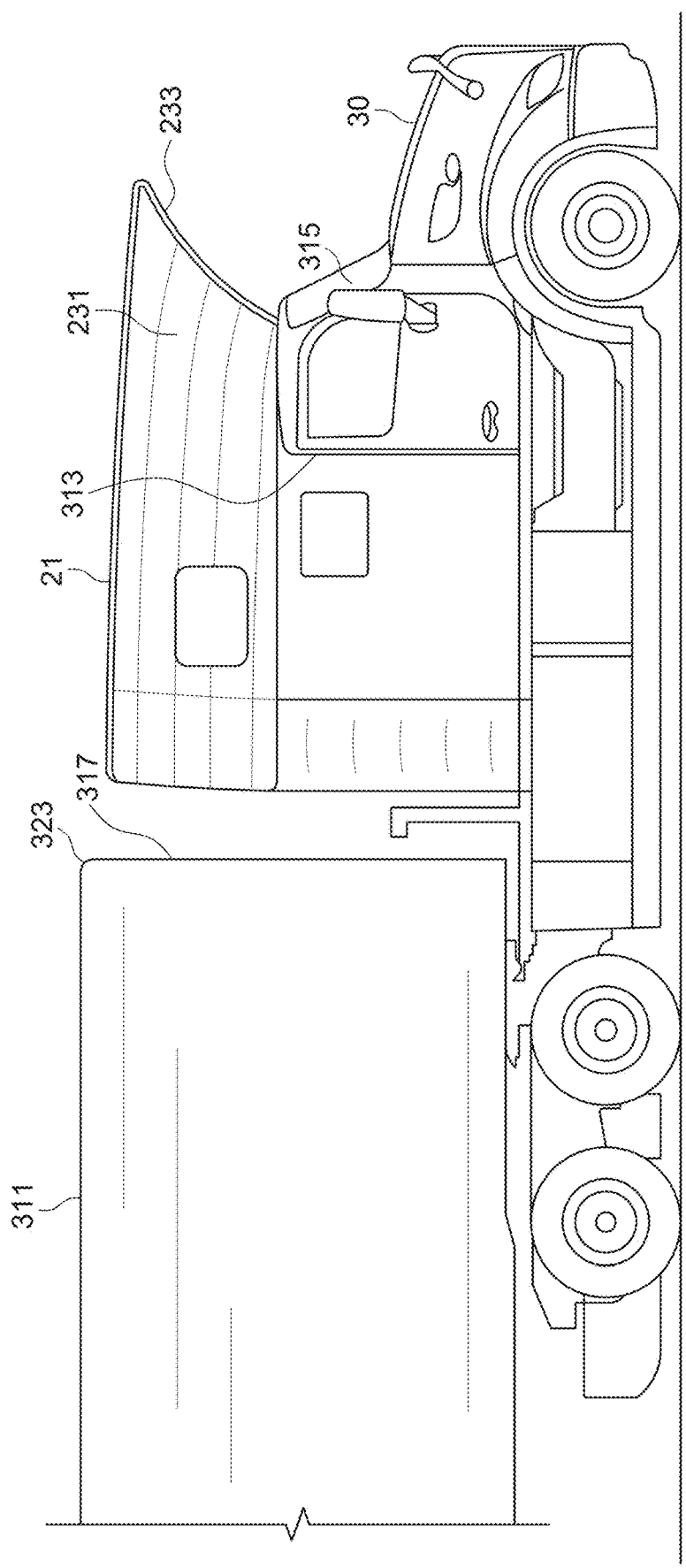
In FIG. 5, the wind-diverting fairing-styled roof of FIG. 4 is shown in side view.
Figure 6:
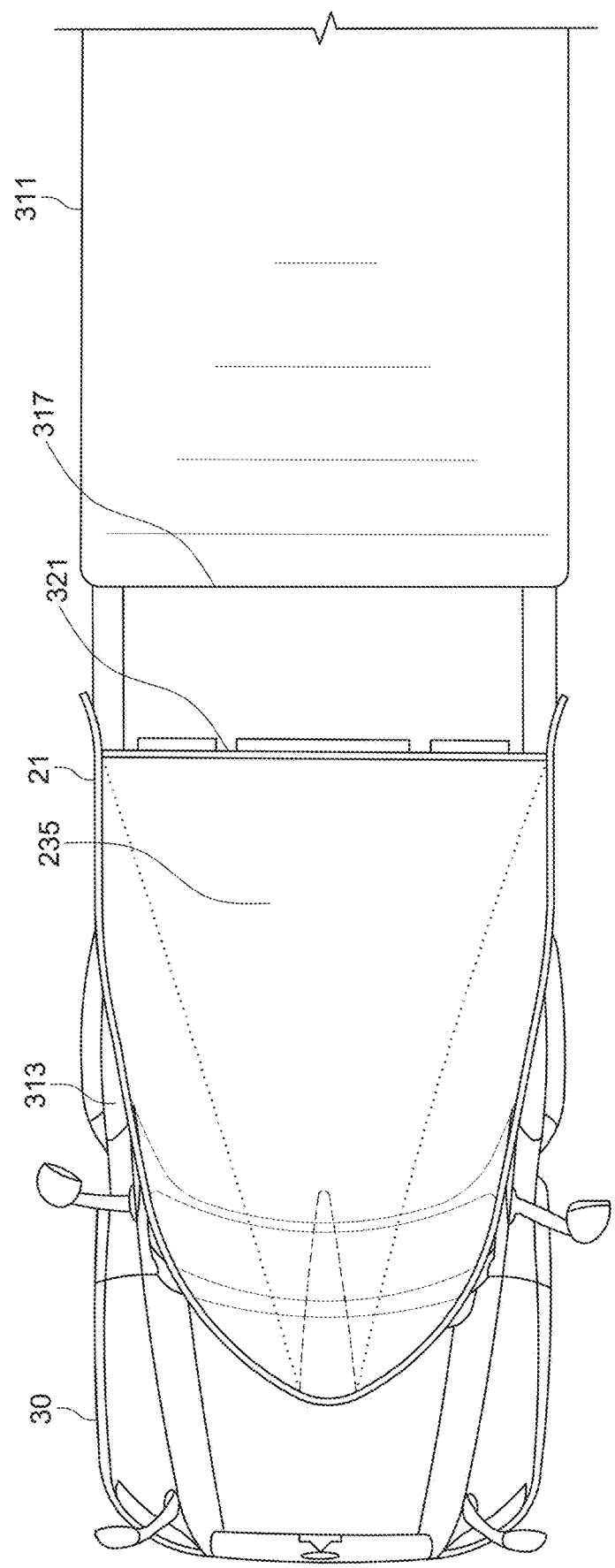
In FIG. 6, the wind-diverting fairing-styled roof of FIG. 4 is shown in top view.

Second Embodiment—FIGS. 4-6

As shown in FIGS. 4, 5 and 6, a second example embodiment comprises a wind-diverting fairing-styled roof 21 of a driver's cab 313 of the tractor 30 of a sleeper-style semitruck disposed in front of an upper portion of a forwardmost laterally extending wall 317 of the rearward cargo box 311. The upper portion of the cargo box front wall 317 extends above the level of a windshield 315 of the sleeper cab 313 wherein substantial headwinds otherwise diverted upwards by the moving vehicle are substantially redirected by the fairing-styled roof 21 to flow in a smooth manner more laterally outwards toward the sides of the vehicle.

The fairing-styled cab roof 21 includes two laterally extending, non-horizontal sidewall portions 231 thereof disposed proximally adjacent together at respective forwardmost portions thereof. The roof-sidewall portions 231 extend substantially rearward on the vehicle in a laterally divergent manner, wherein rearmost portions thereof are arranged substantially apart in lateral disposition near the rear wall 321 of the cab 313. And the roof-sidewall portions 231 each comprise an upper forwardly facing portion thereof arranged to be slanted vertically outwards wherein any normal vector projecting outwards from the surface thereof points downwards below the horizon.

And in this example embodiment, the overhanging upper portions of roof-sidewall portions 231 also each comprise a smoothly curved concave portion thereof that more effectively contains and diverts the upward flow of headwinds to instead be substantially redirected to flow in a smooth manner more laterally along the laterally extending roof-sidewall portions 231 and rearward towards the lateral sides of the vehicle.

In this example embodiment the fairing-styled cab roof 21 is disposed to extend forwards over the cab windshield 315. A nose portion 233 of the fairing-styled roof 21 spans in-between the two roof-sidewall portions 231 at forwardmost portions thereof. And as shown in FIGS. 4, 5 and 6, a roof-top portion 235 extending between the roof-sidewall portions 231 of the fairing-styled cab roof 21, also extends substantially forward above and over the windshield 315 of the cab, wherein rising headwinds diverted upwards by the windshield 315 are substantially diverted laterally while impinging thereon, and are thereby redirected along and largely underneath uppermost portions of the roof-sidewall portions 231 of the fairing-styled cab roof 21 towards the lateral sides of the vehicle.

And the overhanging upper forward-facing portions of the roof-sidewall portions 231 of the fairing-styled cab roof 21 further contain and divert the upward flow of more off-center headwinds to instead be substantially redirected laterally underneath the upper overhanging portions of roof-sidewall portions along the laterally extending roof-sidewall portions 231 of the cab roof 21 towards the lateral sides of the vehicle.

The roof-top portion 235 is also arranged slightly slanted upwards from the front to rear portions thereof, in order to direct any headwind impinging thereon to flow smoothly over the top edge 323 of the rearward cargo box 311.

While the fairing-styled cab roof 21 is shown disposed on the tractor 30 of a sleeper-style semitruck, the fairing-styled cab roof 21 can also be employed on more compact day cabs such as employed on various short-distance LTL semitrucks or even on box trucks having the rearward cargo box permanently attached thereto.

Third Embodiment—FIGS. 7-9 and 19

Figure 7:
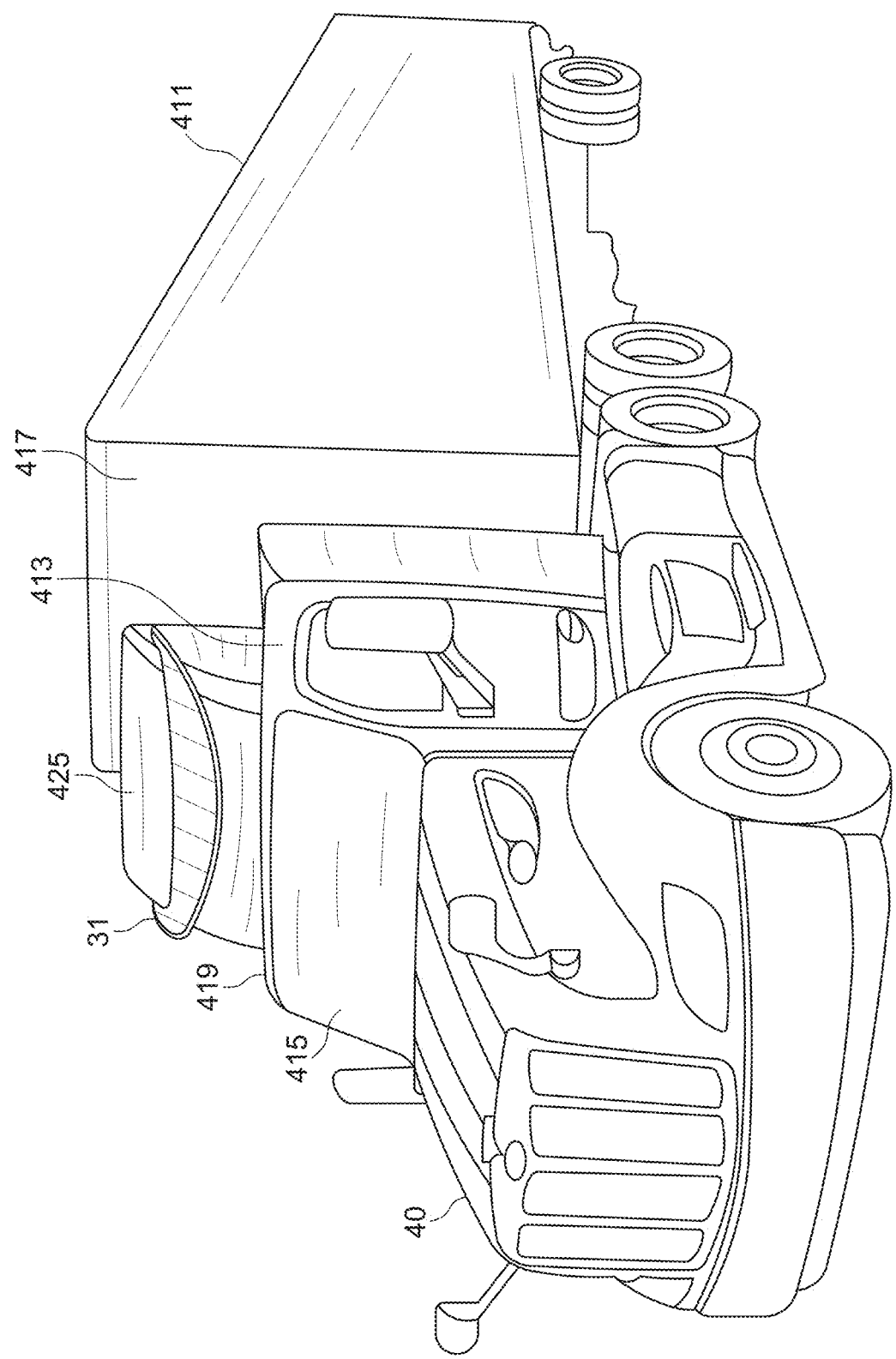
In FIG. 7, a wind-diverting fairing visor assembly is shown in oblique view disposed on a cab roof fairing mounted above a driver's day cab of the tractor of a semitruck having a rearward cargo box of a semitrailer connected thereto.
Figure 8:
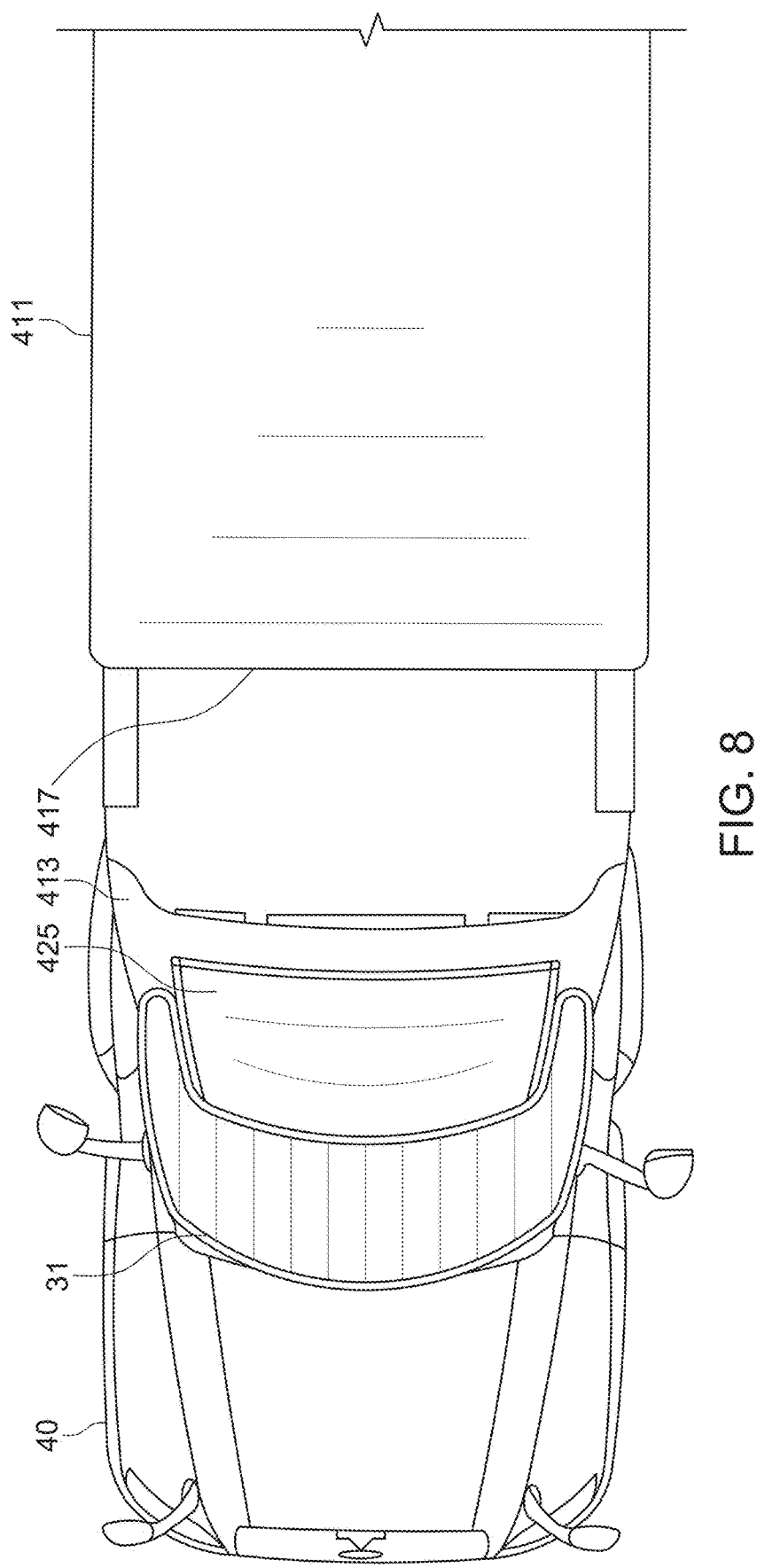
In FIG. 8, the wind-diverting fairing visor of FIG. 7 is shown in top view.
Figure 9:
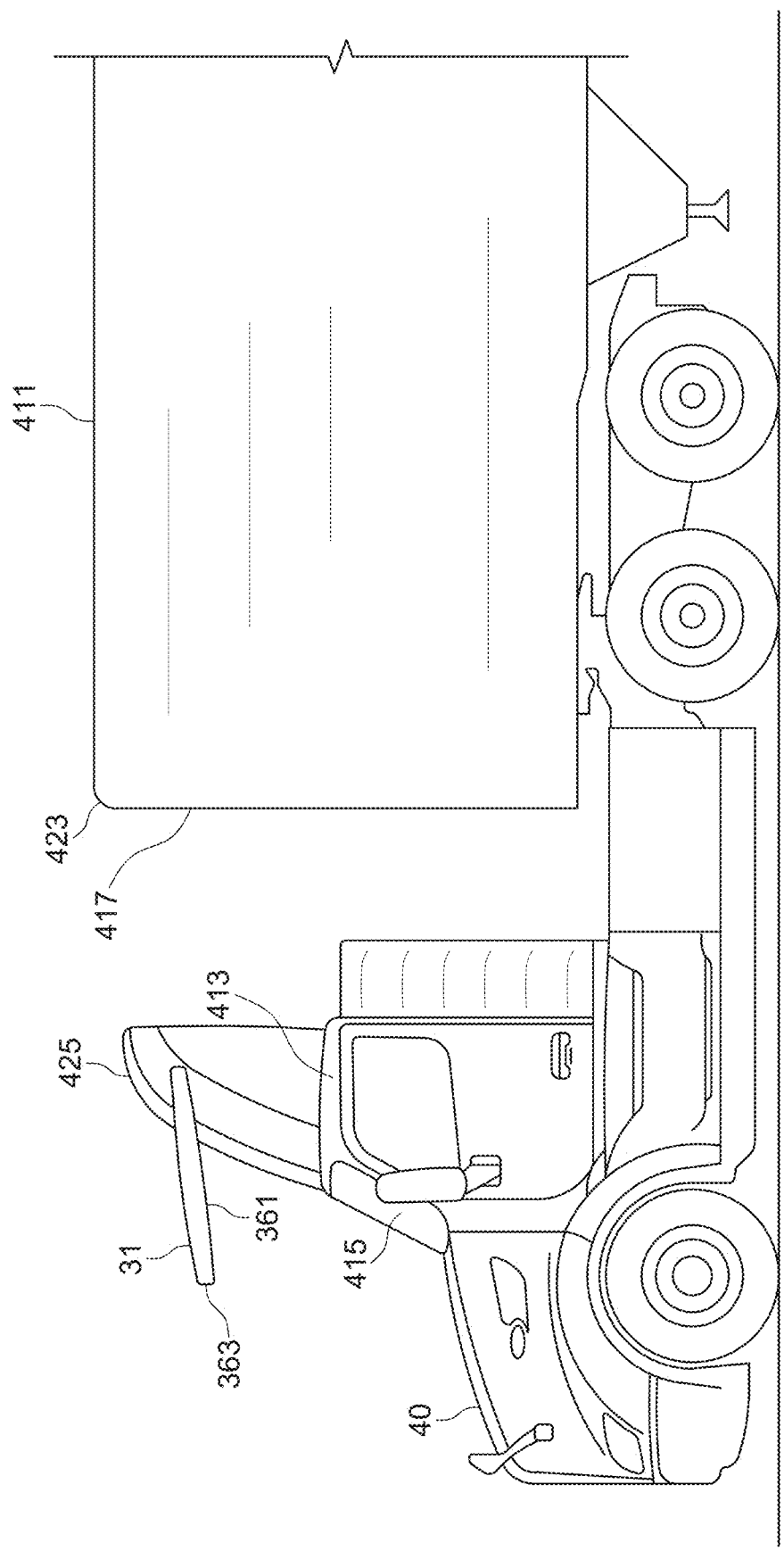
In FIG. 9, the wind-diverting fairing visor of FIG. 7 is shown in side view.
Figure 10:
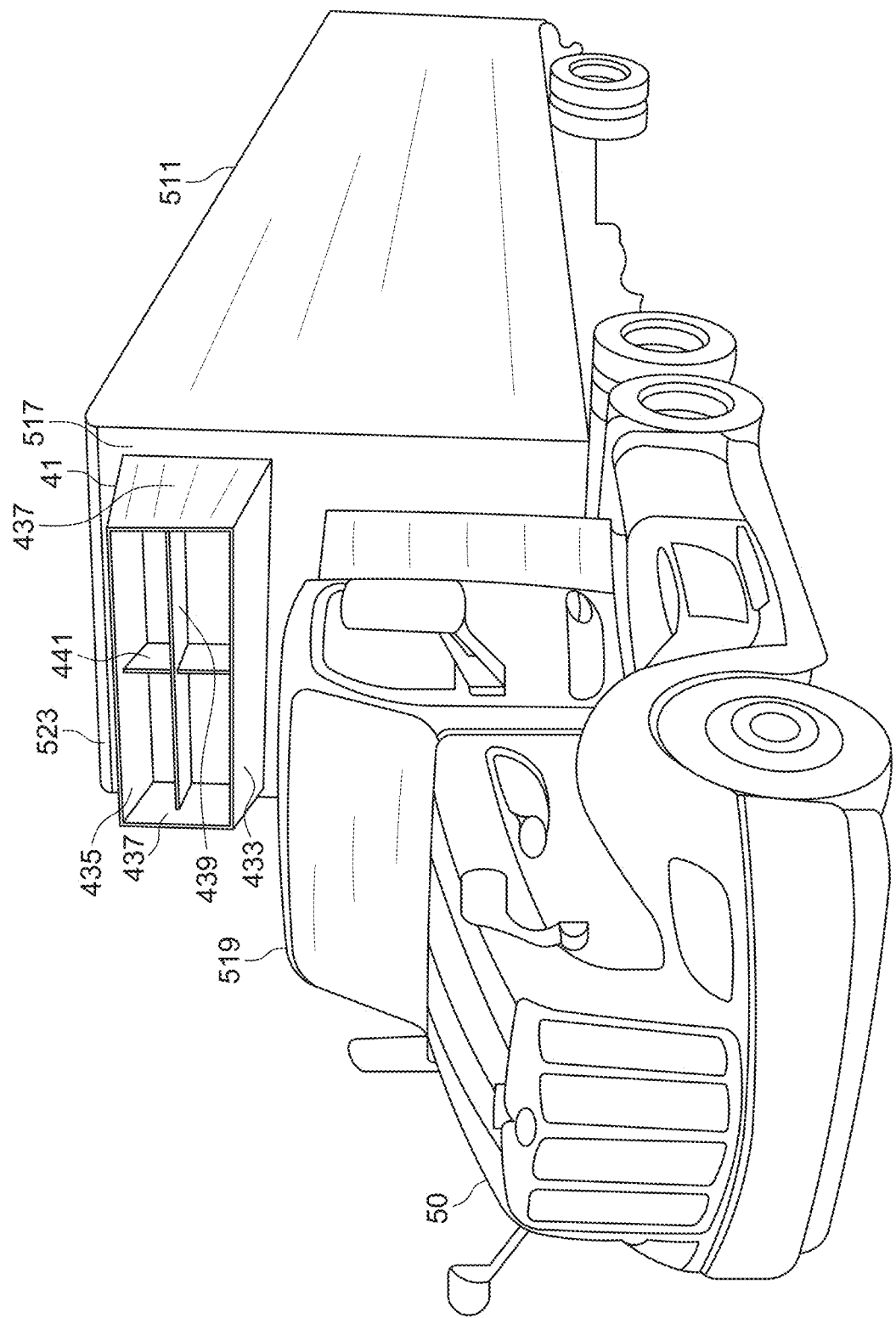
In FIG. 10, a wind-diverting open-panel assembly comprising substantially box-shaped sidewalls is shown in oblique view attached to an upper portion of a forwardmost laterally extending wall of the cargo box of a semitrailer of a semitruck.

As shown in FIGS. 7, 8 and 9, a third example embodiment of the present invention comprises a wind-diverting fairing visor assembly 31 disposed on a cab roof fairing 425 mounted above a cab roof 419 of the tractor 40 of a semitruck in front of an upper portion of a headwind-exposed laterally extending wall 417 of the rearward cargo box 411. The upper portion of the cargo box front wall 417 extends above the roof 419 of the cab 413 wherein a portion of the headwinds otherwise diverted upwards by the moving vehicle are redirected by the fairing visor assembly 31 to flow more laterally outwards toward the sides of the vehicle.

The fairing visor assembly 31 includes a laterally extending wind-diverting lower surface 361 thereof that is substantially exposed to a rising headwind impinging thereon that is itself being deflected substantially upwards by the front windshield 415 of the cab 413. The fairing visor assembly 31 extends substantially forward of the respective surface of the cab roof fairing 425, and is arranged to substantially divert the rising headwind toward lateral sides of the vehicle. The fairing visor assembly 31 also extends substantially across the lateral width of the cab roof fairing 425 to substantially contain the rising headwind to instead flow in substantial proportion towards lateral sides of the vehicle.

Preferably, the fairing visor assembly 31 is disposed in a downwardly slanted manner with a leading edge 363 thereof disposed lower in elevation than rearward lower portions thereof that are aligned immediately adjacent to the cab roof fairing 425, in order to redirect rising headwinds in a more streamlined manner more laterally around the sides of the vehicle in order to minimize any additional vehicle drag induced by the fairing visor assembly 31 in redirecting rising headwinds. If the forward sloping is reduced too much, then any added turbulence developed behind and above the fairing visor assembly 31 could then induce extra drag on the vehicle, largely offsetting the vehicle efficiency savings gained by redirecting rising headwinds more laterally. The ideal amount of forward sloping—as well as the ideal amount forward extension—of the fairing visor assembly 31 will vary, depending upon the particular cab and cargo box geometry, as well as on the particular nominal operating conditions for each vehicle application.

Figure 19:
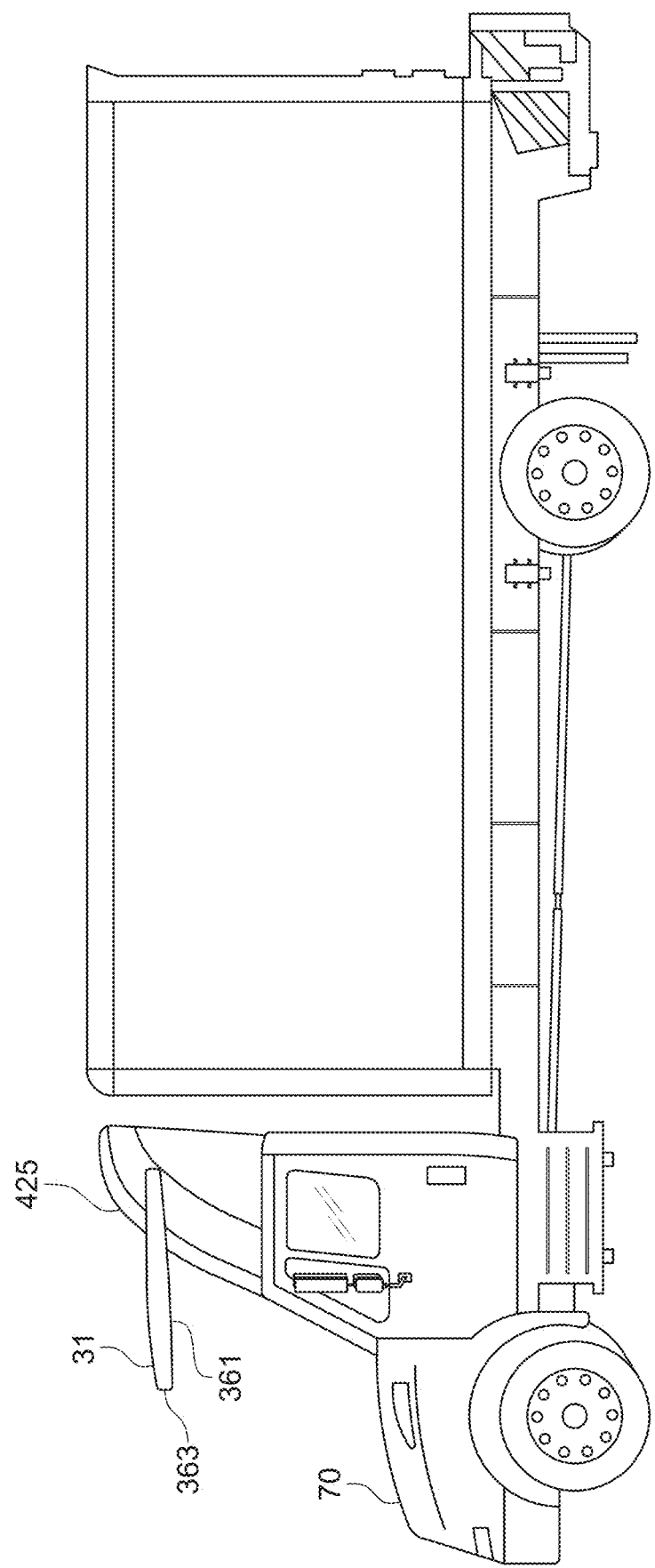
In FIG. 19, a wind-diverting fairing visor assembly is shown in side view disposed on a cab roof fairing mounted above a driver's day cab of a cargo box truck.

While the fairing visor assembly 31 is shown attached to a streamlined cab roof fairing 425 disposed above the cab 413 of a semitruck in FIGS. 7-9, the assembly can also be disposed on other vehicles such as a smaller cargo box truck 70 as shown in FIG. 19.

Forth Embodiment—FIGS. 10-16

Figure 14:
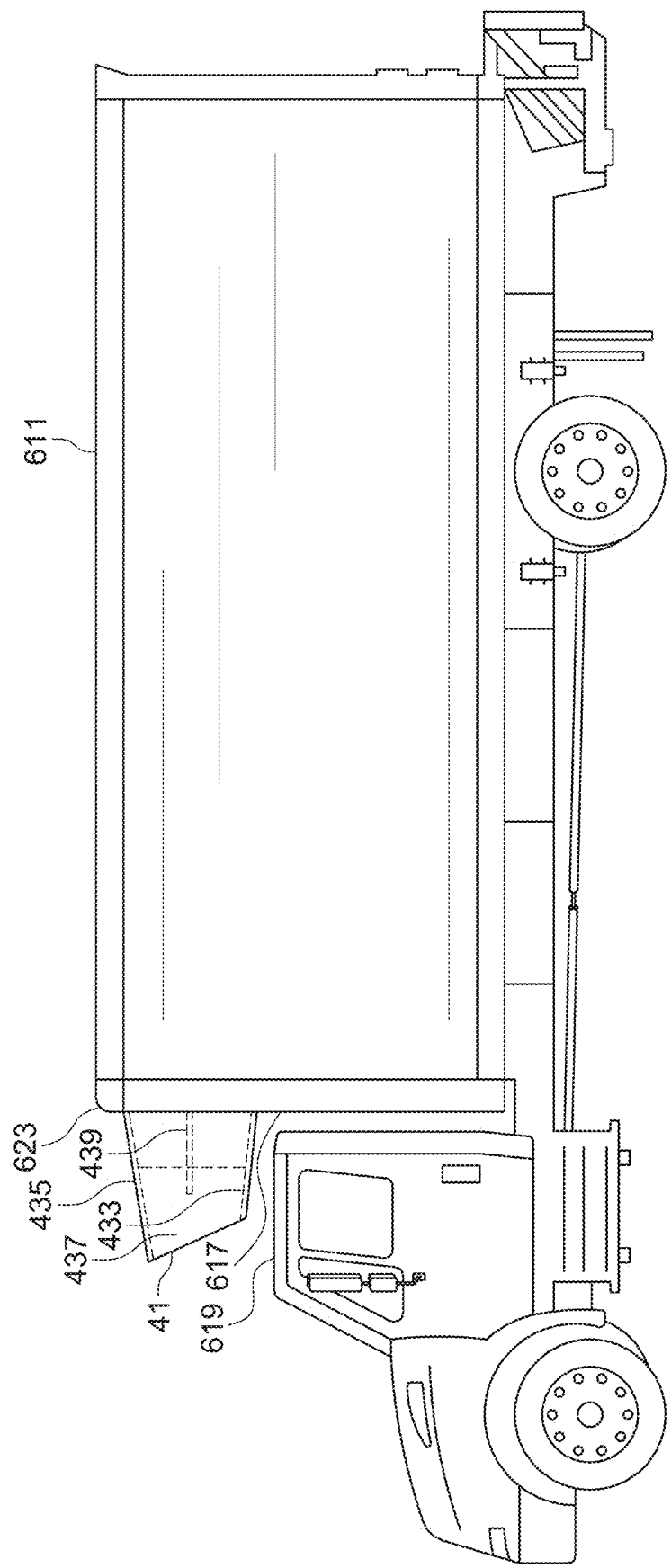
In FIG. 14, a wind-diverting open-panel assembly comprising substantially box-shaped sidewalls is shown in side view attached to an upper portion of a forwardmost laterally extending wall of the cargo box of an industrial box truck.
Figure 15:
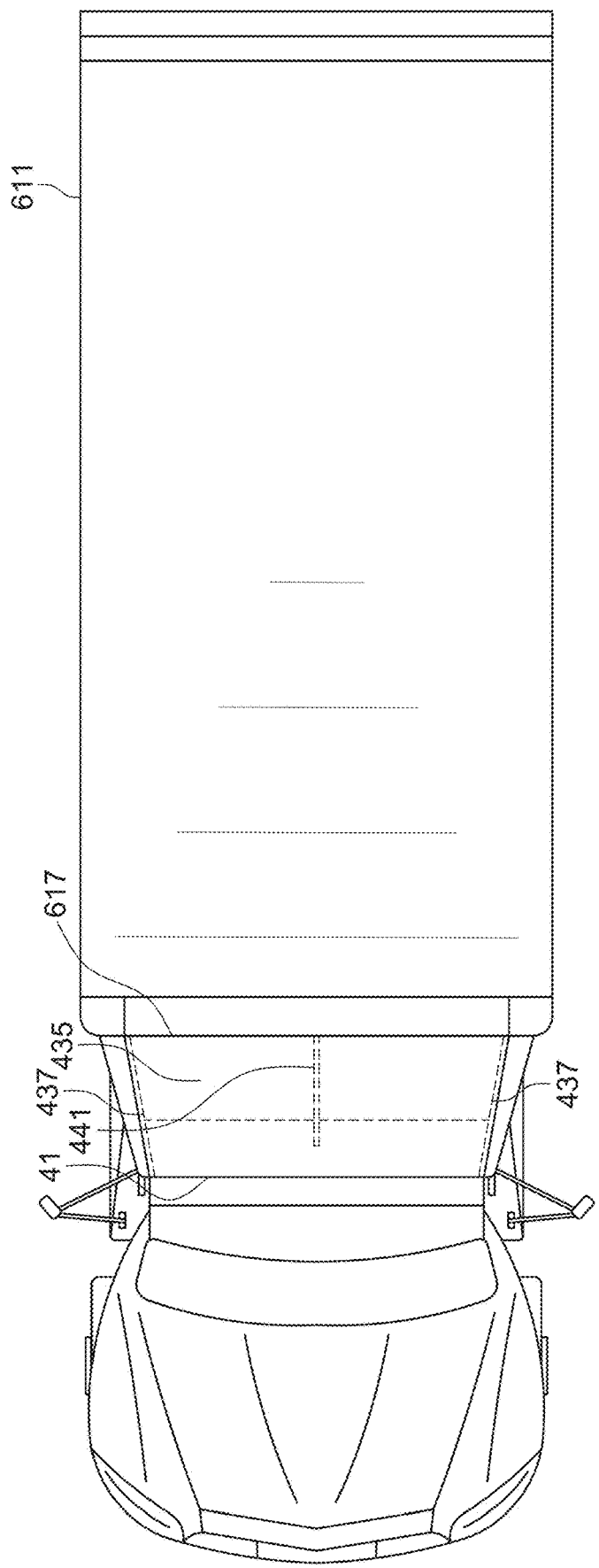
In FIG. 15, the wind-diverting open-panel assembly of FIG. 14 is shown in top view.
Figure 16:
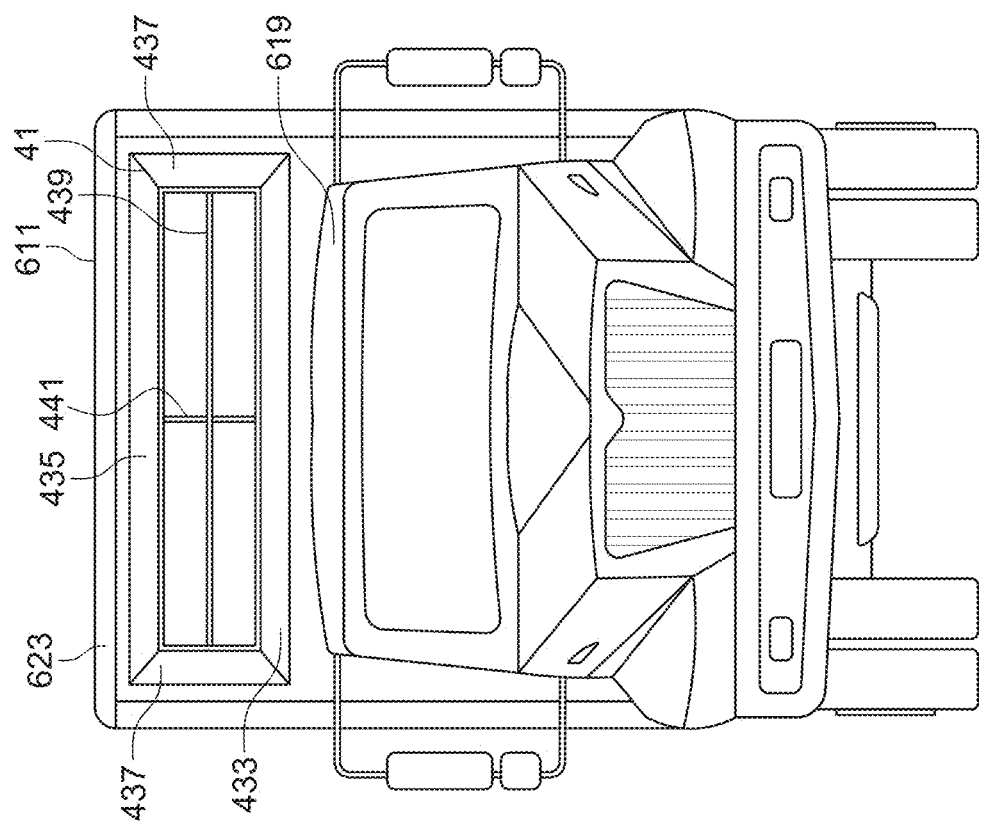
In FIG. 16, the wind-diverting open-panel assembly of FIG. 14 is shown in front view.

As shown in FIGS. 10-16, a fourth example embodiment of the present invention comprises a wind-diverting, open-panel assembly 41 comprising substantially box-shaped sidewalls 433, 435 and 437 attached to an upper portion of a forwardmost laterally extending wall 517 (or 617) of the cargo box of a semitrailer of a semitruck (FIGS. 10-13), or of a smaller cargo box truck (FIGS. 14-16).

In either vehicle application, the box-shaped open-panel assembly 41 is substantially open on the forward end thereof, wherein the forwardmost laterally extending wall 517 (or 617) of the cargo box 511 (or 611) that is located inside the sidewalls 433, 435 and 437 of the panel assembly 41 is substantially exposed to vehicle headwinds impinging thereon.

The uppermost sidewall 435 of the open-panel assembly 41 is ideally arranged wherein the rearmost edge thereof is disposed substantially horizontal and is located near the uppermost edge 523 (or 623) of the rearward cargo box 511 (or 611). The lowermost sidewall 433 of the panel assembly 41 is ideally disposed wherein the forwardmost edge thereof is disposed not lower than the cab roof 519 (or 619). So disposed, the open-panel assembly 41 is substantially exposed to vehicle headwinds impinging thereon across the forward open-ended portion thereof.

As shown, the lowermost sidewall 433 of the open-panel assembly 41 ideally also extends no further forward on the vehicle than the uppermost sidewall 435. And the lateral sidewalls 437 are ideally each slanted slightly inwards while extending forwards substantially apart from the cargo box upper wall 517 (or 617), wherein the open-ended portion of the open-panel assembly 41 then has a substantially smaller cross-sectional area than does the portion of the adjacent cargo box wall that is located inside the sidewalls 433, 435 and 437 of open-panel assembly 41.

With the sidewalls 433, 435 and 437 being disposed proximally adjacent against the cargo box front wall 517 (or 617)—thereby forming substantially sealed enclosure that is only substantially open on the forward open-ended portion thereof—headwind pressure from airflow impinging against the open-ended portion of the open-panel assembly 41 then forms a substantially static flow regime induced inside the sidewall enclosure of the open-panel assembly 41. With relatively high static pressure being developed inside the open-panel assembly 41 from the impinging headwinds, a substantially static pressure wall is then formed across the open face of the open-ended portion of the open-panel assembly 41, that then diverts headwinds impinging thereon to flow around—rather than entering inside—the otherwise substantially sealed enclosure of the open-panel assembly 41.

Figure 11:
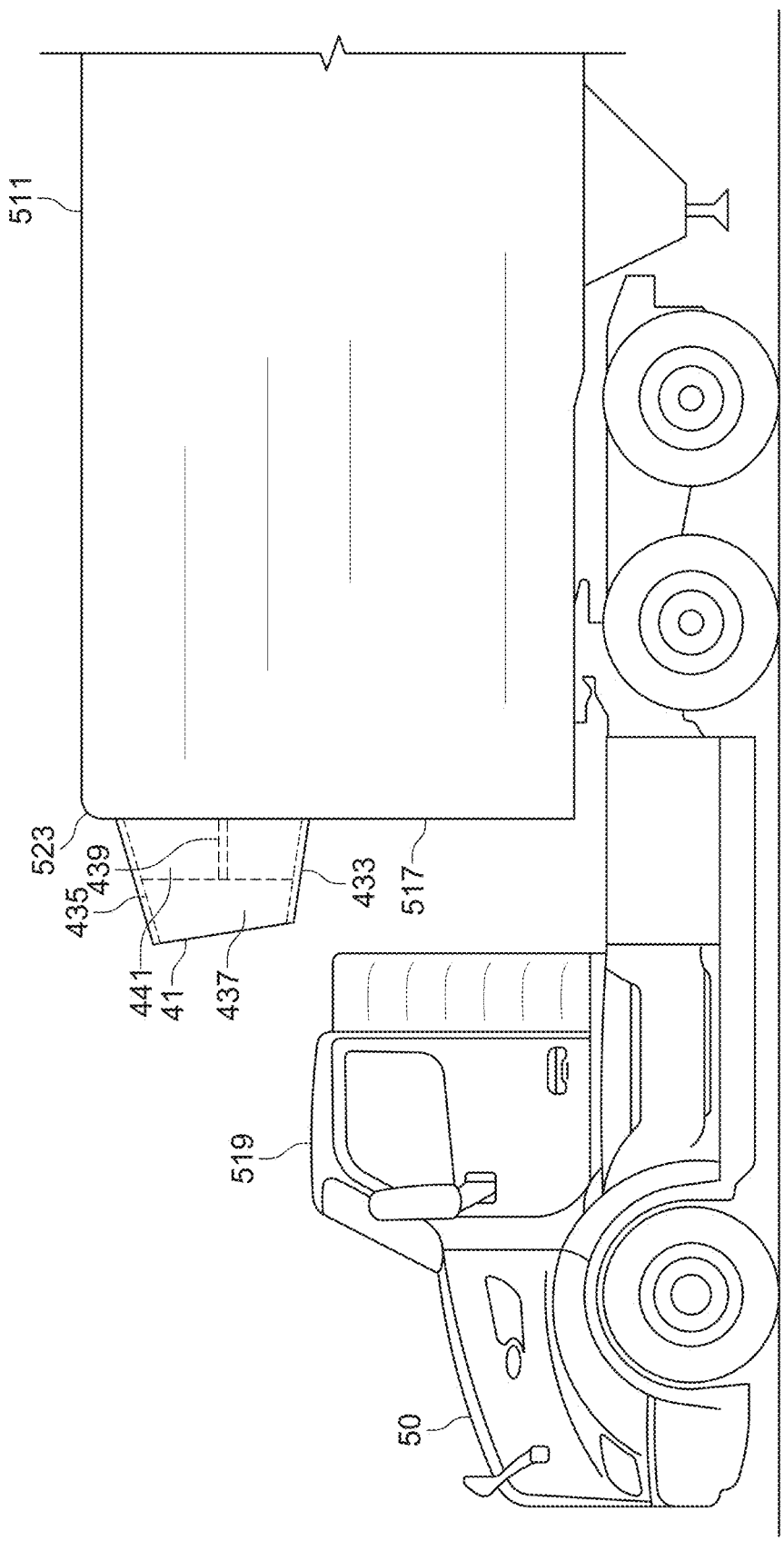
In FIG. 11, the wind-diverting open-panel assembly of FIG. 10 is shown in side view.
Figure 12:
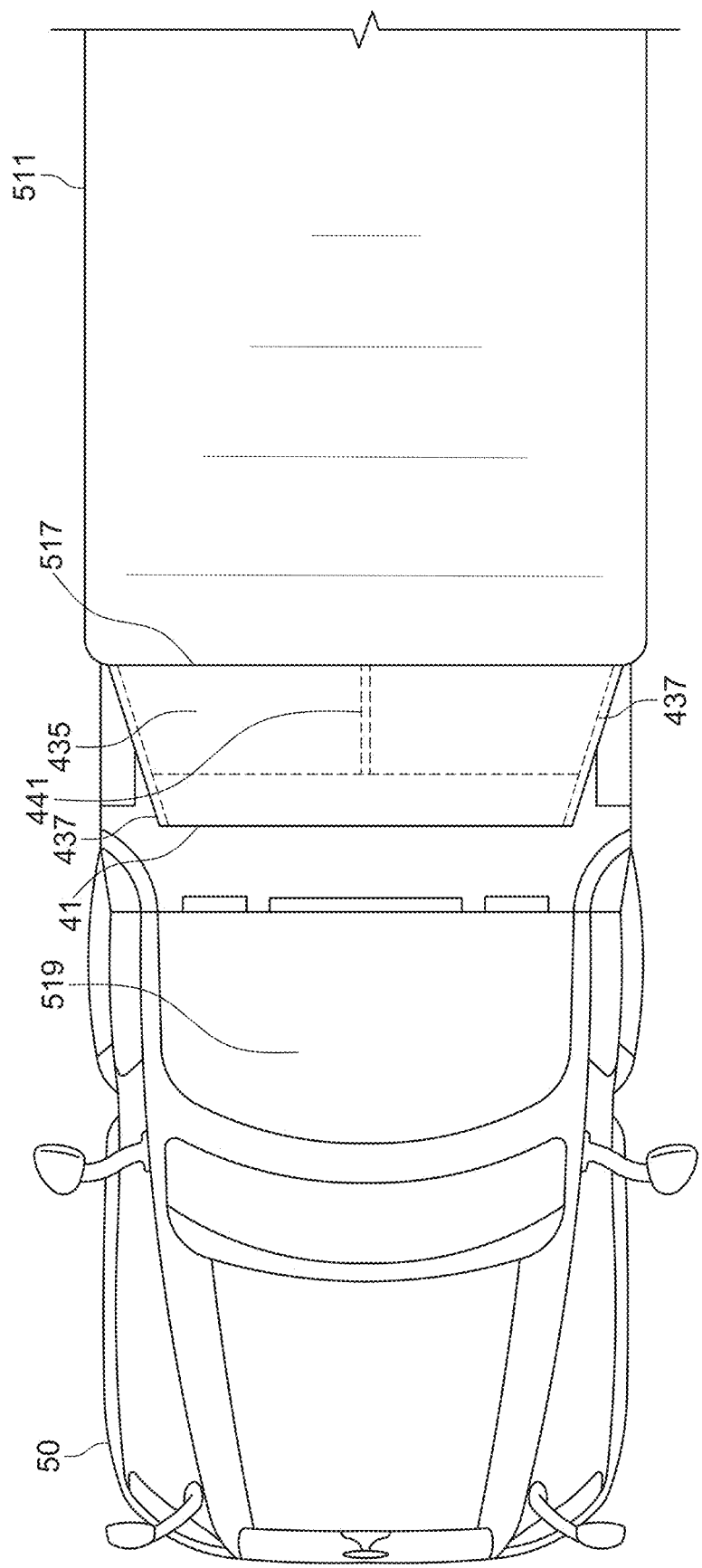
In FIG. 12, the wind-diverting open-panel assembly of FIG. 10 is shown in top view.

With the uppermost sidewall 435 ideally arranged to extend further forward apart from the cargo box front wall 517 (or 617) than does the lowermost sidewall 433, the relative forward extensions of the sidewalls 433, 435 and 437 are then arranged for the substantially flat pressure wall to be developed across the open face of the open-panel assembly 41 and to be oriented to divert headwinds more substantially downwards and laterally around the open-panel assembly 41, rather than to flow largely unimpeded upwards over the top of the open-panel assembly 41 and over the top edge 523 (or 623) of the rearward cargo box 511 (or 611). The invisible pressure wall spanning across the open-face of the front of the open-panel assembly 41 ideally slopes somewhat forwardly as shown in FIG. 11, with the front edge of the uppermost sidewall 435 being disposed to overhang the front edge of the lowermost sidewall 433. And ideally the front edges of the lateral sidewalls 437 are arranged to span largely linearly between the lowermost and uppermost sidewall front edges, thereby inducing a substantially flat pressure wall forming across the forward open face of the open-panel assembly 41.

Alternatively, the front sidewall edges may also be disposed in a curved manner instead in order to induce a more curved invisible pressure wall to be formed across the open-face in front of the open-panel assembly 41, depending on the particular vehicle application and pressure distribution caused by varying headwinds impinging thereon. The sidewalls 433, 435 and 437 can be arranged with a particular curved shape-convex or concave, or a combination thereof-designed to induce an invisible curved pressure wall to form spanning across the forward open face of the open-panel assembly 41 that is better tuned to inhibit any imbalanced headwinds impinging thereon from either flowing into the open enclosure formed by the sidewalls 433, 435 and 437, and from being substantially diverted upwards over the top of the rearward cargo box 511 (or 611).

However, ideally any curved shape of the front edge of the uppermost sidewall 435 would be substantially mirrored in curved shape on the front edge of the lowermost sidewall 433. And likewise, ideally any curved shape of the front edge of a lateral sidewall 437 would be substantially mirrored in curved shape on the front edge of the opposite lateral sidewall 437.

Moreover, in order for the sidewall enclosure to properly divert impinging headwinds to flow around the open-panel assembly 41, circulating airflow from headwinds penetrating inside the open enclosure volume should be minimized. Any substantial air circulation flowing inside open-panel assembly 41 could otherwise destabilize the invisible pressure wall formed across the open-ended face portion of the open-panel assembly 41.

For this reason, the open-panel assembly 41 may also include one or more substantially horizontal mid-level partitions 439 spanning substantially between said laterally outermost sidewalls 437, or even one or more substantially vertical partitions 441 spanning substantially between the uppermost sidewall 435 and the lowermost sidewall 433, or both. These laterally or vertically extending inner partition walls 439 and 441 can each be arranged to further stabilize the air trapped inside the sidewall enclosure volume from substantial circulation into and out of the open face of open-panel assembly 41.

Any air circulation caused by any imbalance of headwind pressure distributed either laterally or vertically across the open-ended face portion of the open-panel assembly 41 may cause substantial circulation to develop either laterally or vertically inside the open-panel enclosure space, leading to reduced effectiveness of the open-panel assembly 41 for diverting headwinds around lateral sides of the vehicle. Reducing the air circulating inside the enclosure enhances the vehicle drag reducing effectiveness of the open-panel assembly 41.

Alternatively, forward-facing open honeycomb structures may be also substituted for the inner partition walls inside the sidewall enclosure for even further enhanced stabilization of air circulation inside the open-panel assembly 41.

At highway speeds, vehicle drag induced from headwinds impinging various vehicle surfaces includes both drag from static air pressure and drag from substantial momentum components of airflow. The static pressure drag component is generally fixed, being largely dependent on the operating altitude of the vehicle. However, the momentum component of drag is highly dependent on impinging headwind speeds and the wind-diverting geometry of the various vehicle surfaces.

With the open-ended face portion of the open-panel assembly 41 comprising a substantially smaller cross-sectional area than does the portion of the adjacent cargo box wall located inside the sidewalls 433, 435 and 437 of open-panel assembly, then the considerable pressure exerted largely by the substantial momentum components from headwinds impinging against the relatively smaller open-ended face portion of the panel assembly 41 is then redistributed across a substantially larger surface area of the portion of the adjacent cargo box wall 517 (or 617) that is located inside the open-panel assembly 41.

Since the momentum component of vehicle drag impinging the smaller open-ended face portion of the open-panel assembly 41 is spread across a larger surface area of the portion of the adjacent cargo box wall 517 (or 617) that is located inside the open-panel assembly 41, then the total resistive vehicle drag force exerted against the inside portion of the adjacent cargo box wall 517 (or 617) is substantially reduced over that where no open-panel assembly 41 is actually present.

For this reason, it can be advantageous to minimize the forward opening area of the panel assembly 41 versus the interiorly shielded wall inside portion of the cargo box 511 (or 611). However, this relationship must be balanced against other factors, including drag induced on the sidewall panels 433, 435 and 437 relative to that saved by extending the aforementioned panels further forwards or inwards, as well as economic and space limitation factors, etc. After all, if the sidewall panel surface areas grow too large, or the panels are arranged too non-streamlined against impinging headwinds, then the drag induced on outer surfaces thereof could grow too large to offset the vehicle efficiency gains obtained from reduced drag on the interiorly shielded inside portion of the adjacent cargo box wall 517 (or 617).

The momentum pressure components from headwinds impinging against outer surfaces of the inwardly slanted sidewalls—pressure components that otherwise would be directed directly against the adjacent cargo box wall 517 (or 617) located immediately inside the sidewalls of open-panel assembly 41—generally exert minimal drag force on the vehicle (since each sidewall is arranged substantially slanted inwards and streamlined for enhanced vehicle headwind penetration) compared to the more blunt-faced non-aerodynamic flat wall portions of the cargo box wall 517 (or 617) located directly behind the slanted sidewalls of the open-panel assembly 41.

These shielded interior perimeter portions of the upper cargo box wall 517 (or 617) located within the open-panel assembly 41—being substantially shielded by the slanted panels from headwinds impinging directly thereon—otherwise produce much more effective resistive drag on the vehicle than do the headwind-exposed slanted sidewalls, which instead divert the impinging headwinds—thereby shielding these interior perimeter portions of the cargo box wall 517 (or 617) located inside the sidewalls of the open-panel assembly 41—in a far more gradually accelerating manner that thereby minimizes any rearwardly directed momentum components of effective vehicle drag pressure induced thereon. With properly arranged sidewalls 433, 435 and 437, the open-panel assembly 41 can then reduce the overall drag induced on the vehicle.

In addition, the lack of an actual laterally extending wall surface spanning across the invisible pressure wall developed across the open-ended face portion of the open-panel assembly 41 also eliminates the accompanying frictional drag that would otherwise be induced thereon by laterally flowing headwinds flowing across the missing wall surface. Such otherwise developed frictional drag induced across the missing laterally oriented wall would be substantial (as exist in various prior art devices mounted directly to the forward wall of the cargo box as in the wall-mounted elliptical shield device of U.S. Pat. No. 4,210,354), since the diverted airflow would be substantially laminar across a major central portion thereof, owing to the normally directed impinging headwind airflow necessarily then exerting substantial air pressure directly thereon to thereby minimize any development of adjacent turbulent airflow layers—which induce substantially smaller shear forces across adjacent wall surfaces than do laminar flows—across the face of the missing forward wall portion.

And the missing enhanced frictional drag from substantially laminar airflows passing across the otherwise exposed laterally extending wall surface (or by the missing forward wall surface present in various aforementioned prior art fairings) would further slow these winds passing across the surface thereof through increased frictional drag thereon, and thereby would further enhance changes in the momentum component of pressure drag in the changing airflow speeds from the impinging headwinds moving across the wall surfaces, both accelerating and decelerating while passing around to the sides vehicle. Enhanced momentum changes in the airflow would then further exacerbate the power being dissipated in drag, and thereby also the power being lost in drag by the moving vehicle.

Hence, eliminating exposure of the perimeter portion of the adjacent cargo box wall 517 (or 617) that is both located inside the panel assembly sidewalls and is shielded by the slanted sidewall panels, to substantial headwinds flowing laterally across the surface thereof, then further reduces the aerodynamic power lost and thus reduces the effective overall drag on the vehicle. And eliminating headwind exposure of the aforementioned missing forward wall surface across the opening of the open-panel assembly 41 also similarly reduces the effective overall drag on the vehicle.

Thus, the combined vehicle drag reduction produced by reduced effective vehicle drag on the slanted sidewalls together with the reduced resistive pressure drag from the reduced redistributed internal momentum pressures induced inside the panel enclosure pressing against the internally disposed cargo box wall 517 (or 617) inside the open-panel assembly 41, together with the drag reduction produced by the lack of a solid forward wall spanning across the open-ended face portion of the open-panel assembly 41—thereby eliminating substantial drag induced thereon—yields a substantial reduction in overall vehicle drag produced by the open-panel assembly 41.

Each particular vehicle application—depending largely on the impinging headwind vector distributions across forward-facing surfaces of the vehicle—will determine optimal configuration of the open-panel assembly 41 for optimally reducing drag on the vehicle under normal driving conditions.

Some vehicle applications will require a more downwardly slanted orientation for the open-ended face portion of the open-panel assembly 41, with the uppermost sidewall extending substantially more forward than the lowermost sidewall 433 in order to divert substantial rising headwinds to flow more laterally to the sides of the vehicle. Other vehicle applications will require a less downwardly slanted orientation for the open-ended face portion of the open-panel assembly 41, with the lowermost sidewall 433 extending forward up to as much as the forward disposition of the uppermost sidewall 435, in order to divert more directly impinging vehicle headwinds more directly toward lateral sides of the vehicle.

And some vehicle applications will include the sidewalls of the open-panel assembly 41 extending more substantially forward for a smaller forward opening cross-section when space on the vehicle permits. And still other vehicle applications will include sidewalls 433, 435 and 437 slanted more substantially inwards when forward space is limited. However, each vehicle application will include at least a portion of otherwise upwardly diverted headwinds to instead be diverted to flow more laterally around the sides of the vehicle in order to reduce the effective drag produced on the vehicle by reducing the amount of airflow being lifted upwards over the moving vehicle.

Moreover, the present invention is not limited to the embodiments presented shown on larger vehicles, but can also have application on smaller, similarly configured vehicles as well, such as recreational vehicle trailers and even smaller box trucks.

Moving vehicles divert substantial headwinds upwards over the top of the vehicle. At highway speeds the airflow being lifted against gravity over the top of the vehicle comprises substantial weight, thereby consuming considerable propulsive power of the vehicle. The present invention comprises embodiments that divert a substantial portion of the otherwise lifted airflow on vehicles having substantial non-aerodynamic cargo boxes connected thereto, to instead flow in a smooth manner more laterally around the sides of the vehicle, to thereby reduce overall vehicle drag and improve vehicle propulsive efficiency.

From the description above, it becomes evident that several embodiments of the present invention each comprise the aforementioned advantages:

(a) An improved wind-diverting fairing assembly disposed above a driver's cab of a cargo box truck or semitruck in front of an upper portion of a forwardmost laterally extending wall of the cargo box that extends above a roof of the cab wherein substantial headwinds otherwise diverted upwards by the moving vehicle are redirected by the fairing assembly to flow in a smooth manner more laterally outwards toward the sides of the vehicle, reduces overall vehicle drag and improves vehicle propulsive efficiency.

(b) An improved wind-diverting fairing-styled roof structure of a driver's cab of a cargo box truck or the tractor of a semitruck disposed in front of an upper portion of a forwardmost laterally extending wall of the rearward cargo box that extends above a windshield of the cab, wherein substantial headwinds otherwise diverted upwards by the moving vehicle are redirected by the fairing-styled roof to flow in a smooth manner more laterally outwards toward the sides of the vehicle, reduces overall vehicle drag and improves vehicle propulsive efficiency.

(c) An improved wind-diverting fairing visor assembly disposed above a driver's cab of a cargo box truck or the tractor of a semitruck in front of an upper portion of a forwardmost laterally extending wall of the cargo box that extends above a roof of the cab wherein substantial headwinds otherwise diverted upwards by the moving vehicle are redirected by the fairing visor assembly to flow in a smooth manner more laterally outwards toward the sides of the vehicle, reduces overall vehicle drag and improves vehicle propulsive efficiency.

(d) An improved wind-diverting open-ended panel assembly comprising substantially box-shaped sidewalls attached to an upper portion of a forwardmost laterally extending wall of the cargo box of a box truck or of a semitrailer of a semitruck. The box-shaped open-ended panel assembly is substantially open on the forward end thereof, wherein the forwardmost laterally extending wall of the cargo box located inside the open-ended panel assembly sidewalls is substantially exposed to vehicle headwinds impinging thereon. The open-ended panel assembly is arranged wherein a portion of headwinds otherwise diverted upwards by the moving vehicle are instead redirected by the panel assembly to flow in a smooth manner more laterally outwards toward the sides of the vehicle, to thereby reduce overall vehicle drag and improves vehicle propulsive efficiency.

While the embodiments described in detail herein generally illustrate the application of the present invention to cargo box trucks and semitrucks, other embodiments could be similarly applied to other trucks and vehicle types having similar non-aerodynamic configurations that divert substantial headwinds upwards on the forward-moving vehicle.

And while some of the embodiments shown include cab fairings and cab roof configurations formed from more curved assemblies and molded form panels, other embodiments comprising relatively inexpensive flat panels can also be used for simplified enhanced streamlining on the vehicle. Further examples of alternative embodiments include having panels mounted at various angles, all ideally limited to causing a vehicle headwind from being unnecessarily further lifted substantially upwards by the forward-moving vehicle.

In addition, further embodiments may include various devices disposed in variable configurations that change the configuration of the total headwind-exposed surfaces thereof to adjust in order to further optimize the wind-diverting capacity of the device based on the vehicle operating conditions. An example could include a panel assembly device configuration changing one or more slanted panel dispositions automatically in response to changes in the vehicle speed in order to optimally reduce vehicle drag over a range of vehicle operating conditions.

Accordingly, the embodiments of the present invention should not be limited to the specific examples illustrated and described above, but rather to the appended claims and their legal equivalents.

I claim:

1. A wind-diverting apparatus for reducing drag on a terrestrial vehicle in substantial forward motion on a horizontal plane, said vehicle having a rearward cargo box connected or fixed thereto which extends across the lateral width of the body of the vehicle while also extending substantially above a roof of a driver's cab of the vehicle, with said apparatus being disposed on the vehicle above said cab in front of an upper portion of a forwardmost laterally extending wall of said cargo box wherein said upper cargo box wall portion disposed above said cab roof would otherwise be exposed to headwinds diverted by said apparatus from impinging thereon, wherein the apparatus comprises:

a wind-diverting fairing assembly comprising two laterally extending substantially non-horizontal sidewalls disposed substantially adjacent together at respective forwardmost portions thereof;

said laterally extending sidewalls extending substantially rearward on the vehicle in a laterally divergent manner wherein rearmost portions thereof are arranged substantially apart in lateral disposition; and said laterally extending sidewalls each comprising an upper forwardly facing portion thereof arranged to be slanted vertically outwards wherein any normal vector projecting laterally outwards from the surface thereof points downwards below the horizon, said upper sidewall portions each comprising a major portion of the upper half of the respective said laterally extending sidewall, whereby the apparatus is arranged to divert a portion of headwinds impinging thereon from otherwise being lifted substantially upwards over the top of the vehicle and to flow instead more laterally toward either side of the vehicle.

2. The apparatus of claim 1, wherein, further:

the vehicle is a commercial motor vehicle configured for operation on public highways within the United States of America;

the laterally extending sidewalls each extend laterally outwards no further than respective lateral sides of the cargo box;

the upper sidewall portions are each arranged to be slanted vertically outwards wherein any normal vector projecting laterally outwards from a major portion of the surface thereof points downwards at least 10 degrees below the horizon;

said fairing assembly comprises a substantially streamlined nose joint spanning in-between said forwardmost adjacent sidewall portions;

said nose joint is centrally located near the lateral middle of the cab;

the forwardmost adjacent sidewall portions are disposed no further laterally apart than one-third the lateral width of the cab roof;

an uppermost portion of said central nose joint is located substantially forward of a lowermost portion of the central nose joint;

said uppermost nose portion is furthermore located below the level of a rearmost upper portion of said laterally extending sidewalls;

the central nose joint extends forward of an uppermost edge of said front windshield of the cab;

the laterally extending sidewalls extend upwards from the central nose joint to a level positioned not higher than an uppermost forward edge of the cargo box;

said lowermost nose portion is located no further forward on the vehicle than said uppermost windshield edge; and the fairing assembly furthermore comprises a top panel spanning across the space between substantial uppermost portions of the laterally extending sidewalls.

3. The apparatus of claim 2, wherein, further:

the vehicle is cargo box truck having the cargo box fixed to the vehicle in a substantially permanent manner;

the cargo box spans longitudinally across a major length of the vehicle;

the upper sidewall portions are each arranged to be slanted vertically outwards wherein any normal vector projecting laterally outwards from a major portion of the surface thereof points downwards at least 20 degrees below the horizon;

the central nose joint spans no further laterally than one-quarter the lateral width of the cab roof;

the laterally extending sidewalls each extend laterally outwards substantially proximate to the respective lateral side of the cab roof;

said outwardly slanted upper major sidewall portions each comprise at least half of the respective said laterally extending sidewall;

the laterally extending sidewalls together extend laterally across a major lateral width of the cargo box; and the top panel spans across the space between major uppermost portions of the laterally extending sidewalls.

4. The apparatus of claim 3, wherein, further:

the laterally extending sidewalls are each arranged to comprise a substantially concave portion thereof, said concave portion spanning across a major length or a major height of the respective said sidewall; and the upper sidewall portions are each arranged to be slanted vertically outwards wherein any normal vector projecting laterally outwards from a major portion of said concave portion thereof points downwards at least 30 degrees below the horizon.

5. The apparatus of claim 2, wherein, further:

the vehicle comprises a tractor of a semitruck;

the upper sidewall portions are each arranged to be slanted vertically outwards wherein any normal vector projecting laterally outwards from a major portion of the surface thereof points downwards at least 20 degrees below the horizon;

the central nose joint spans no further laterally than one-quarter the lateral width of the cab roof;

the laterally extending sidewalls each extend laterally outwards substantially proximate to the respective lateral side of the cab roof;

said outwardly slanted upper major sidewall portions each comprise at least half of the respective said laterally extending sidewall;

the laterally extending sidewalls together extend laterally across a major lateral width of the cargo box; and the top panel spans across the space between major uppermost portions of the laterally extending sidewalls.

6. The apparatus of claim 5, wherein, further:

the laterally extending sidewalls are each arranged to comprise a substantially concave portion thereof, said concave portion spanning across a major length or a major height of the respective said sidewall; and the upper sidewall portions are each arranged to be slanted vertically outwards wherein any normal vector projecting laterally outwards from a major portion of the concave portion thereof points downwards at least 30 degrees below the horizon.

7. A wind-diverting apparatus for reducing drag on a terrestrial vehicle in substantial forward motion on a horizontal plane, said vehicle having a rearward cargo box connected or fixed thereto which extends laterally across the lateral width of the body of the vehicle while also extending substantially above an uppermost edge a front windshield of a driver's cab of the vehicle, with said apparatus comprising a major uppermost portion of a headwind-exposed streamlined roof of said cab wherein said streamlined roof comprises those forwardly facing cab roof surfaces that are positioned wholly above the level of said uppermost windshield edge and that are aligned directly in front of an upper portion of a forwardmost laterally extending wall of said cargo box disposed above the uppermost windshield edge, wherein the apparatus furthermore comprises:

the streamlined roof comprising two laterally extending substantially non-horizontal sidewall portions thereof, said roof-sidewall portions being disposed substantially adjacent together at forwardmost portions thereof, while each said roof-sidewall portion furthermore extending substantially rearward therefrom in a laterally divergent manner wherein rearmost portions each thereof are separated substantially apart with each said rearmost roof-sidewall portion being disposed laterally outwards towards a respective laterally outermost side of the cab;

the streamlined roof furthermore comprising a substantially non-vertical, upper top portion thereof spanning across the space between substantial uppermost portions of said divergent roof-sidewall portions;

the streamlined roof furthermore comprising a substantially non-horizontal, nose portion thereof spanning wholly in-between said forwardmost roof-sidewall portions; and the divergent roof-sidewall portions comprising an upper portion each thereof arranged to be slanted vertically outwards wherein any normal vector projecting laterally outwards from the surface thereof points downwards below the horizon, and wherein said slanted roof-sidewall portions each comprise a major portion of an upper half of each respective said divergent roof-sidewall portion, whereby the apparatus is arranged to divert a portion of headwinds impinging thereon from otherwise being lifted substantially upwards over the top of the vehicle and to flow instead more laterally toward either side of the vehicle.

8. The apparatus of claim 7, wherein, further:

the vehicle is a commercial motor vehicle configured for operation on public highways within the United States of America;

said upper roof-top portion comprises a substantial portion of said major uppermost roof portion;

said roof-nose portion spans no further laterally than one-third the lateral width of said front windshield;

an uppermost portion of the upper roof-top portion is located substantially rearward of a lowermost portion thereof, said lowermost roof-top portion being disposed forwardly, proximate to the roof-nose portion;

the divergent roof-sidewall portions each extend upwards from the roof-nose portion to a level positioned above the lowermost roof-top portion;

the slanted roof-sidewall portions each comprise a major portion of each respective said divergent roof-sidewall portion; and the divergent roof-sidewall portions each extend laterally outwards to substantially proximate to respective lateral edges of the streamlined roof.

9. The apparatus of claim 8, wherein, further:

the vehicle is cargo box truck having the cargo box fixed to the vehicle in a permanent manner;

the cargo box spans longitudinally across a major length of the vehicle;

the roof-nose portion spans no further laterally than one-quarter the lateral width of the front windshield;

the roof-nose portion extends forward of the uppermost windshield edge;

the lowermost roof-top portion is located substantially no further rearward on the vehicle than a forwardmost portion of the uppermost windshield edge;

the slanted roof-sidewall portions are each arranged to be slanted vertically outwards wherein any normal vector projecting laterally outwards from a major portion of the surface thereof points downwards at least 15 degrees below the horizon; and the divergent roof-sidewall portions taken together extend laterally across a major lateral width of the cargo box.

10. The apparatus of claim 8, wherein, further:

the vehicle comprises a tractor of a semitruck;

the roof-nose portion spans no further laterally than one-quarter the lateral width of said front windshield;

the roof-nose portion extends forward of the uppermost windshield edge;

the lowermost roof-top portion is located substantially no further rearward on the vehicle than a forwardmost portion of the uppermost windshield edge;

the slanted roof-sidewall portions are each arranged to be slanted vertically outwards wherein any normal vector projecting laterally outwards from a major portion of the surface thereof points downwards at least 15 degrees below the horizon; and the divergent roof-sidewall portions taken together extend laterally across a major lateral width of the cargo box.

11. A wind-diverting apparatus for reducing drag on a terrestrial vehicle in substantial forward motion on a horizontal plane, said vehicle having a streamlined, headwind-exposed, forward-facing, fairing-styled structure disposed wholly above the level of an uppermost edge a front windshield of a driver's cab of the vehicle, with said fairing structure spanning across a major lateral width of the front windshield while also extending upwards substantially above of the level of said uppermost windshield edge and aligned directly in front of an upper portion of a forwardmost laterally extending wall of a rearward cargo box that is itself connected or fixed to the vehicle, said upper cargo box wall extending laterally substantially across the lateral width of the body of the vehicle, and with the vehicle configured wherein said upper cargo box wall portion is substantially shielded by the fairing structure from headwinds otherwise impinging thereon, wherein said apparatus comprises:

a wind-diverting assembly comprising a fairing visor assembly disposed both substantially centered laterally on the fairing structure and substantially above the uppermost windshield edge;

the fairing visor assembly spanning across the major lateral width of front windshield;

the fairing visor assembly comprising a laterally extending wind-diverting lower surface thereof that is substantially exposed to a rising headwind impinging thereon, said rising headwind being deflected substantially upwards by the front windshield;

said lower visor surface comprising a rearmost trailing portion thereof disposed adjacent along a major length thereof to an uppermost portion of the fairing structure positioned substantially above the uppermost windshield edge wherein a laterally central lower portion of the fairing structure that is also disposed directly below said rearmost trailing lower visor portion is itself also substantially exposed to the rising headwind impinging thereon, said fairing structure uppermost portion comprising a major uppermost portion of the fairing structure;

the fairing visor assembly comprising a forwardmost leading edge thereof disposed not higher in elevation than respective portions of the rearmost trailing portion of the lower visor surface;

the fairing visor assembly furthermore comprising a central portion of said leading edge being disposed not higher in elevation than laterally outermost portions of the leading edge;

said central leading-edge portion being disposed forward apart from a forwardmost portion of the rearmost trailing portion of the lower visor surface a minimum forward offset equal to not less than half the vertical distance between the uppermost windshield edge and the central leading-edge portion; and the central leading-edge portion being disposed wholly above the uppermost windshield edge a minimum vertical clearance equal to not less than one-third the vertical distance between the uppermost windshield edge and the top of said cargo box, whereby the apparatus is arranged to divert a portion of headwinds impinging thereon from otherwise being lifted substantially upwards over the top of the vehicle and to flow instead more laterally toward either side of the vehicle.

12. The apparatus of claim 11, wherein, further:
the vehicle is a commercial motor vehicle configured for operation on public highways within the United States of America;
the fairing visor assembly comprises the leading edge thereof being disposed distinctly lower in elevation than respective portions of the rearmost trailing portion of the lower visor surface;
the fairing structure upper portion is disposed wholly above an elevation positioned midway between the uppermost windshield edge and the top of the cargo box;
said minimum forward offset is equal to not less than two-thirds the vertical distance between the uppermost windshield edge and the central leading-edge portion;
said minimum vertical clearance is equal to not less than five-twelfths the vertical distance between the uppermost windshield edge and the top of the cargo box; and
the central leading-edge portion extends further forward apart from a respective central portion of the rearmost trailing portion than any laterally outermost said respective rearmost trailing portions of the lower visor surface.

13. The apparatus of claim 12, wherein, further:
a streamlined roof of the cab comprises the fairing structure;
the minimum forward offset is equal to not less than three-quarters the vertical distance between the uppermost windshield edge and the central leading-edge portion; and
the minimum vertical clearance is equal to not less than seven-sixteenths the vertical distance between the uppermost windshield edge and the top of the cargo box.

14. The apparatus of claim 13, wherein, further:
the vehicle comprises a tractor of a semitruck;
the minimum forward offset is equal to not less than the vertical distance between the uppermost windshield edge and the central leading-edge portion; and
the minimum vertical clearance is equal to not less than half the vertical distance between the uppermost windshield edge and the top of the cargo box.

15. The apparatus of claim 12, wherein, further:
the fairing structure is a roof fairing attached to the cab;
the minimum forward offset is equal to not less than three-quarters the vertical distance between the uppermost windshield edge and the central leading-edge portion; and
the minimum vertical clearance is equal to not less than seven-sixteenths the vertical distance between the uppermost windshield edge and the top of the cargo box.

16. The apparatus of claim 15, wherein, further:
the vehicle is cargo box truck having the cargo box fixed to the vehicle in a permanent manner;
the cargo box spans longitudinally across a major length of the vehicle;
the minimum forward offset is equal to not less than the vertical distance between the uppermost windshield edge and the central leading-edge portion;
the minimum vertical clearance is equal to not less than half the vertical distance between the uppermost windshield edge and the top of the cargo box; and
the fairing visor spans forward of the uppermost windshield edge.

17. The apparatus of claim 15, wherein, further:
the vehicle comprises a tractor of a semitruck;
the minimum forward offset is equal to not less than the vertical distance between the uppermost windshield edge and the central leading-edge portion; and
the minimum vertical clearance is equal to not less than half the vertical distance between the uppermost windshield edge and the top of the cargo box.

18. A wind-diverting apparatus for reducing drag on a terrestrial vehicle in substantial forward motion on a horizontal plane, said vehicle having a rearward cargo box connected or fixed thereto which extends laterally across the lateral width of the body of the vehicle while also extending substantially above a roof of a driver's cab of the vehicle, with said apparatus being mounted higher on the vehicle above said cab roof directly in front of an upper portion of a forwardmost laterally extending wall of said cargo box wherein said forwardmost upper cargo box wall portion located above the cab roof is exposed to headwinds impinging thereon across a major portion thereof, wherein the apparatus comprises:
a wind-diverting open-panel assembly comprising four longitudinally extending sidewalls joined together along longitudinally extending opposing respective edges thereof to form a poly-sided, closed-shaped figure as forwardmost sidewall edges thereof are viewed from directly in front of the vehicle, with said sidewalls being disposed adjacent to the forwardmost upper wall portion along respective rearmost edges thereof while each said sidewall also substantially extends longitudinally forward therefrom toward the front of the vehicle;
said open-panel assembly arranged wherein said longitudinally extending sidewalls are furthermore joined together to form a rearmost poly-sided closed-shaped figure as rearmost sidewall edges thereof are also viewed from directly in front of the vehicle;
the open-panel assembly furthermore arranged wherein the length of the perimeter of said forwardmost sidewall edges forming said forwardmost poly-sided closed-shaped figure is not more than the length of the perimeter of said rearmost sidewall edges forming said rearmost closed poly-sided shaped figure;
the open-panel assembly furthermore arranged wherein a rearmost edge of an uppermost said sidewall is disposed substantially horizontal and located substantially adjacent to an uppermost edge of said forwardmost cargo box wall wherein an upper headwind impinging on an uppermost surface of said uppermost sidewall is diverted largely upwards to flow above the cargo box;
the open-panel assembly furthermore arranged wherein a forwardmost edge of the uppermost sidewall is disposed not higher than respective portions of said rearmost edge thereof along respective major lengths thereof;
the open-panel assembly furthermore arranged wherein a forwardmost edge of a lowermost said sidewall is disposed not lower than respective portions of a rearmost edge thereof along respective major lengths thereof;
the open-panel assembly furthermore arranged wherein forwardmost edges of any laterally outermost said sidewalls are each disposed no further laterally outwards than respective portions of respective rearmost edges thereof along respective major lengths thereof;

said lowermost sidewall being disposed substantially no further forward on the vehicle than the forwardmost edge of the uppermost sidewall; and major central forwardmost portions of said sidewalls remain respectively laterally or respectively vertically disconnected from each other, wherein said wind-diverting assembly remains substantially open in-between said respective sidewalls wherein a major portion of the forwardmost upper wall portion positioned inside the perimeter of said forwardmost sidewall edges forming said forwardmost poly-sided closed-shaped figure when viewed from directly in front of the vehicle remains exposed to headwinds impinging thereon, whereby the apparatus is arranged to divert a portion of headwinds impinging thereon from otherwise being lifted substantially upwards over the top of the vehicle and to flow instead more laterally toward either side of the vehicle.

19. The apparatus of claim 18, wherein, further:

the vehicle is a commercial motor vehicle configured for operation on public highways within the United States of America;

the open-panel assembly is arranged wherein said rearmost edge-viewed figure is substantially rectangular;

the open-panel assembly is furthermore arranged wherein the rearmost edges of the laterally outermost sidewalls are each not less than one-quarter as long as the rearmost edge of the uppermost sidewall;

the open-panel assembly is furthermore arranged wherein the forwardmost edge of the uppermost sidewall is disposed distinctly lower than respective portions of the rearmost edge thereof;

the open-panel assembly is furthermore arranged wherein the forwardmost edge of the lowermost sidewall is disposed distinctly higher than respective portions of the rearmost edge thereof;

the open-panel assembly is furthermore arranged wherein the forwardmost edge of the lowermost sidewall is disposed not lower than cab roof; and the open-panel assembly is furthermore arranged wherein the length of the perimeter of said forwardmost sidewall edges forming said forwardmost edge-viewed figure is distinctly less than that of said rearmost sidewall edges forming said rearmost edge-viewed figure.

20. The apparatus of claim 19, wherein, further:

the vehicle comprises a tractor of a semitruck;

the open-panel assembly is arranged wherein forwardmost edges of the laterally outermost sidewalls are each disposed laterally inside respective portions of rearmost edges thereof;

the open-panel assembly is furthermore arranged wherein the length of the perimeter of said forwardmost sidewall edges forming said forwardmost edge-viewed figure is substantially less than that of the rearmost sidewall edges forming said rearmost edge-viewed figure;

the open-panel assembly comprises a substantially horizontal mid-level partition spanning substantially in-between said laterally outermost sidewalls, wherein said horizontal partition is disposed substantially adjacent to the forwardmost cargo box wall in-between the uppermost and lowermost sidewalls;

the open-panel assembly furthermore comprises a substantially vertical partition spanning substantially in-between said uppermost and lowermost sidewalls, wherein said vertical partition is disposed substantially adjacent to the forwardmost cargo box wall in-between the laterally outermost sidewalls; and the forwardmost edge of the uppermost sidewall is disposed substantially forward of the forwardmost edge of the lowermost sidewall.

21. The apparatus of claim 19, wherein, further:

the vehicle is cargo box truck having the cargo box fixed to the vehicle in a permanent manner;

the cargo box spans longitudinally across a major length of the vehicle;

the open-panel assembly is arranged wherein forwardmost edges of the laterally outermost sidewalls are each disposed laterally inside respective portions of rearmost edges thereof;

the open-panel assembly is furthermore arranged wherein the length of the perimeter of said forwardmost sidewall edges forming said forwardmost edge-viewed figure is substantially less than that of the rearmost sidewall edges forming said rearmost edge-viewed figure;

the open-panel assembly comprises a substantially horizontal mid-level partition spanning substantially in-between said laterally outermost sidewalls, wherein said horizontal partition is disposed substantially adjacent to the forwardmost cargo box wall in-between the uppermost and lowermost sidewalls;

the open-panel assembly furthermore comprises a substantially vertical partition spanning substantially in-between said uppermost and lowermost sidewalls, wherein said vertical partition is disposed substantially adjacent to the forwardmost cargo box wall in-between the laterally outermost sidewalls; and the forwardmost edge of the uppermost sidewall is disposed substantially forward of the forwardmost edge of the lowermost sidewall.

22. A wind-diverting apparatus for reducing drag on a terrestrial vehicle in substantial forward motion on a horizontal plane, said vehicle configured wherein vehicle headwinds are being diverted upwards by impinging on laterally central, headwind-exposed, forward-facing vehicle surfaces that are disposed forwardly on the vehicle while also spanning substantially across the major lateral width of the vehicle, and that are also positioned below respective levels of the wind-diverting apparatus itself, wherein said apparatus comprises:

a wind-diverting fairing structure of, or that is disposed on, the vehicle;

said fairing structure disposed in a substantially elevated location positioned substantially toward the front of the vehicle;

the fairing structure itself comprising two laterally extending substantially non-horizontal sidewalls disposed substantially adjacent together at respective forwardmost portions thereof;

said laterally extending sidewalls spanning upwards to extend substantially above any front windshield of the vehicle;

the laterally extending sidewalls furthermore extending substantially rearward on the vehicle in a laterally divergent manner wherein rearmost portions thereof are arranged substantially apart in lateral disposition; and the laterally extending sidewalls each comprising an upper forwardly facing portion thereof arranged to be slanted vertically outwards wherein any normal vector projecting laterally outwards from the surface thereof points downwards below the horizon, said upper sidewall portions each comprising a major portion of the upper half of the respective said laterally extending sidewall, whereby the apparatus is arranged to divert a portion of headwinds impinging thereon from otherwise being lifted substantially upwards over the top of the vehicle and to flow instead more laterally toward either side of the vehicle.

23. The apparatus of claim 22, wherein, further:

the upper sidewall portions are each arranged to be slanted vertically outwards wherein any normal vector projecting laterally outwards from a major portion of the surface thereof points downwards at least 10 degrees below the horizon;

the fairing structure comprises a substantially streamlined nose joint spanning in-between said forwardmost adjacent sidewall portions;

said nose joint is centrally located near the lateral middle of the vehicle;

the forwardmost adjacent sidewall portions are disposed no further laterally apart than one-third the lateral width of the vehicle;

an uppermost portion of said central nose joint is located substantially forward of a lowermost portion of the central nose joint;

said uppermost nose portion is furthermore located below the level of rearmost upper portions of the laterally extending sidewalls;

the central nose joint extends forward of an uppermost portion of said laterally central, headwind-exposed, forward-facing vehicle surfaces positioned below respective levels of the fairing structure;

the laterally extending sidewalls extend upwards from the central nose joint to a level positioned not higher than an uppermost portion of the vehicle located immediately rearward of the fairing structure; and the fairing structure furthermore comprises a top panel spanning across the space between the laterally extending sidewalls along substantial lengths thereof.

24. The apparatus of claim 23, wherein, further:

the upper sidewall portions are each arranged to be slanted vertically outwards wherein any normal vector projecting laterally outwards from a major portion of the surface thereof points downwards at least 20 degrees below the horizon;

the central nose joint spans no further laterally than one-quarter the lateral width of the vehicle;

the laterally extending sidewalls each extend laterally outwards substantially proximate to the respective lateral side portion of the vehicle disposed directly adjacent thereto;

said outwardly slanted upper major sidewall portions each comprise at least half of the respective said laterally extending sidewall;

the laterally extending sidewalls together extend laterally across a major lateral width of the vehicle;

said lowermost nose portion is located no further forward on the vehicle than said uppermost portion of said laterally central, headwind-exposed, forward-facing vehicle surfaces positioned below respective levels of the fairing structure; and the top panel spans across the space between the laterally extending sidewalls along major lengths thereof.

25. The apparatus of claim 24, wherein, further:

the laterally extending sidewalls are each arranged to comprise a substantially concave portion thereof, said concave portion spanning across a major length or a major height of the respective said sidewall; and the upper sidewall portions are each arranged to be slanted vertically outwards wherein any normal vector projecting laterally outwards from a major portion of the concave portion thereof points downwards at least 30 degrees below the horizon.

26. The apparatus of claim 9, wherein, further:

the divergent roof-sidewall portions are each arranged to comprise a substantially concave portion thereof, said concave portion spanning across both a major length and a major height of the respective roof-sidewall portion; and the slanted roof-sidewall portions are each arranged to be slanted vertically outwards wherein any normal vector projecting laterally outwards from a major portion of the concave portion thereof points downwards at least 30 degrees below the horizon.

27. The apparatus of claim 10, wherein, further:

the divergent roof-sidewall portions are each arranged to comprise a substantially concave portion thereof, said concave portion spanning across both a major length and a major height of the respective roof-sidewall portion; and the slanted roof-sidewall portions are each arranged to be slanted vertically outwards wherein any normal vector projecting laterally outwards from a major portion of the concave portion thereof points downwards at least 30 degrees below the horizon.

28. A wind-diverting apparatus for reducing drag on a terrestrial vehicle in substantial forward motion on a horizontal plane, said vehicle configured wherein vehicle headwinds are being diverted upwards by impinging on laterally central, headwind-exposed, forward-facing vehicle surfaces that are disposed forwardly on the vehicle while also spanning substantially across the major lateral width of the vehicle, and that are also positioned below respective levels of the wind-diverting apparatus itself, wherein said apparatus comprises:

a wind-diverting fairing structure of, or that is disposed on, the vehicle;

said fairing structure disposed in a substantially elevated location positioned substantially toward the front of the vehicle;

the fairing structure itself comprising two laterally extending substantially non-horizontal sidewalls disposed substantially adjacent together at respective forwardmost portions thereof;

said laterally extending sidewalls spanning upwards to extend substantially above any front windshield of the vehicle;

the laterally extending sidewalls furthermore extending substantially rearward on the vehicle in a laterally divergent manner wherein rearmost portions thereof are arranged substantially apart in lateral disposition;

the fairing structure furthermore comprising laterally outer overhanging side portions of a top panel, said overhanging side portions extending laterally outwards distinctly further than respective uppermost portions of the laterally extending sidewalls along major lengths each thereof; and the top panel arranged wherein forwardmost portions thereof are disposed distinctly below the level of respective rearmost portions thereof, whereby the apparatus is arranged to divert a portion of headwinds impinging thereon from otherwise being lifted substantially upwards over the top of the vehicle and to flow instead more laterally toward either side of the vehicle.

29. The apparatus of claim 28, wherein, further:

the vehicle is a commercial motor vehicle configured for operation on public highways within the United States of America;

the laterally extending sidewalls each extend laterally outwards no further than respective lateral sides of the vehicle;

the laterally extending sidewalls together extend laterally across a major lateral width of the vehicle;

the laterally extending sidewalls each comprise an upper forwardly facing portion thereof arranged to be slanted vertically outwards wherein any normal vector projecting laterally outwards from the surface thereof points downwards below the horizon, said upper sidewall portions each comprising a major portion of the upper half of the respective said laterally extending sidewall;

the upper sidewall portions are each arranged to be slanted vertically outwards wherein any normal vector projecting laterally outwards from a major portion of the surface thereof points downwards at least 10 degrees below the horizon;

the top panel spans across the space between the laterally extending sidewalls along substantial lengths thereof;

the overhanging side portions extend laterally outwards substantially further than respective uppermost portions of the laterally extending sidewalls along major lengths each thereof;

the fairing structure comprises a substantially streamlined nose joint spanning in-between said forwardmost adjacent sidewall portions;

said nose joint is centrally located near the lateral middle of the vehicle;

the forwardmost adjacent sidewall portions are disposed no further laterally apart than one-third the lateral width of the vehicle;

an uppermost portion of said central nose joint is located substantially forward of a lowermost portion of the central nose joint;

said uppermost nose portion is furthermore located below the level of rearmost upper portions of the laterally extending sidewalls;

the central nose joint extends forward of an uppermost portion of said laterally central, headwind-exposed, forward-facing vehicle surfaces positioned below respective levels of the fairing structure; and the laterally extending sidewalls extend upwards from the central nose joint to a level positioned not higher than an uppermost portion of the vehicle located immediately rearward of the fairing structure.

30. The apparatus of claim 29, wherein, further:

the vehicle is cargo box truck has the cargo box fixed to the vehicle in a substantially permanent manner;

the cargo box spans longitudinally across a major length of the vehicle;

the upper sidewall portions are each arranged to be slanted vertically outwards wherein any normal vector projecting laterally outwards from a major portion of the surface thereof points downwards at least 20 degrees below the horizon;

the top panel spans across the space between the laterally extending sidewalls along major lengths thereof;

the central nose joint spans no further laterally than one-quarter the lateral width of the vehicle;

said lowermost nose portion is located no further forward on the vehicle than said uppermost portion of said laterally central, headwind-exposed, forward-facing vehicle surfaces positioned below respective levels of the fairing structure; and the laterally extending sidewalls each extend laterally outwards substantially proximate to the respective lateral side portion of the vehicle disposed directly adjacent thereto.

31. The apparatus of claim 29, wherein, further:

the vehicle comprises a tractor of a semitruck;

the upper sidewall portions are each arranged to be slanted vertically outwards wherein any normal vector projecting laterally outwards from a major portion of the surface thereof points downwards at least 20 degrees below the horizon;

the top panel spans across the space between the laterally extending sidewalls along major lengths thereof;

the central nose joint spans no further laterally than one-quarter the lateral width of the vehicle;

said lowermost nose portion is located no further forward on the vehicle than said uppermost portion of said laterally central, headwind-exposed, forward-facing vehicle surfaces positioned below respective levels of the fairing structure; and the laterally extending sidewalls each extend laterally outwards substantially proximate to the respective lateral side portion of the vehicle disposed directly adjacent thereto.

32. The apparatus of claim 28, wherein, further:

the vehicle is a commercial motor vehicle configured for operation on public highways within the United States of America;

the laterally extending sidewalls are substantially curved along major lengths thereof;

the laterally extending sidewalls each extend laterally outwards no further than respective lateral sides of the vehicle;

the laterally extending sidewalls together extend laterally across a major lateral width of the vehicle;

the fairing structure comprises a substantially streamlined nose joint spanning in-between said forwardmost adjacent sidewall portions;

said nose joint is centrally located near the lateral middle of the vehicle;

the forwardmost adjacent sidewall portions are disposed no further laterally apart than one-third the lateral width of the vehicle;

the laterally extending sidewalls extend upwards from the central nose joint to a level positioned not higher than an uppermost portion of the vehicle located immediately rearward of the fairing structure;

an uppermost portion of said central nose joint is located below the level of rearmost upper portions of the laterally extending sidewalls; and the top panel spans across the space between the laterally extending sidewalls along major lengths thereof.

33. The apparatus of claim 32, wherein, further:

the vehicle is cargo box truck has the cargo box fixed to the vehicle in a substantially permanent manner;

the cargo box spans longitudinally across a major length of the vehicle;

the central nose joint spans no further laterally than one-quarter the lateral width of the vehicle; and the laterally extending sidewalls each extend laterally outwards substantially proximate to the respective lateral side portion of the vehicle disposed directly adjacent thereto.

34. The apparatus of claim 32, wherein, further:

the vehicle comprises a tractor of a semitruck;

the central nose joint spans no further laterally than one-quarter the lateral width of the vehicle; and the laterally extending sidewalls each extend laterally outwards substantially proximate to the respective lateral side portion of the vehicle disposed directly adjacent thereto.

* * * * *